(12) United States Patent
Meyer et al.

(10) Patent No.: US 10,830,212 B2
(45) Date of Patent: Nov. 10, 2020

(54) LIFTING DEVICE FOR LIFTING A COMPONENT OF A WIND TURBINE AND METHOD FOR ASSEMBLING COMPONENTS OF A WIND TURBINE

(71) Applicant: Wobben Properties GmbH, Aurich (DE)

(72) Inventors: Wolfgang Meyer, Wiesmoor (DE); Frank Lülker, Aurich (DE); Sascha Beeckmann, Veenhusen (DE)

(73) Assignee: Wobben Properties GmbH, Aurich (DE)

( * ) Notice: Subject to any disclaimer, the term of this patent is extended or adjusted under 35 U.S.C. 154(b) by 13 days.

(21) Appl. No.: 16/065,657

(22) PCT Filed: Jan. 4, 2017

(86) PCT No.: PCT/EP2017/050146
§ 371 (c)(1),
(2) Date: Jun. 22, 2018

(87) PCT Pub. No.: WO2017/118663
PCT Pub. Date: Jul. 13, 2017

(65) Prior Publication Data
US 2019/0003459 A1 Jan. 3, 2019

(30) Foreign Application Priority Data
Jan. 8, 2016 (DE) .................. 10 2016 200 160

(51) Int. Cl.
*B66C 1/10* (2006.01)
*F03D 80/00* (2016.01)
*F03D 13/10* (2016.01)

(52) U.S. Cl.
CPC .............. *F03D 13/10* (2016.05); *B66C 1/108* (2013.01); *F03D 80/00* (2016.05);
(Continued)

(58) Field of Classification Search
CPC ......... F03D 13/10; F03D 80/00; B66C 1/108; Y02E 10/726; F05B 2220/706; F05B 2230/61
See application file for complete search history.

(56) References Cited

U.S. PATENT DOCUMENTS 8,595,931 B2  12/2013 Riddell et al.
8,807,611 B2   8/2014 Lülker
(Continued)

FOREIGN PATENT DOCUMENTS

CA      2951974 A1   12/2015
CN    102951549 A     3/2013
(Continued)

OTHER PUBLICATIONS

DE 20 2012 005 409 U1 Machine Translation 2012 (Year: 2012).*

*Primary Examiner* — Lee A Holly
(74) *Attorney, Agent, or Firm* — Seed Intellectual Property Law Group LLP

(57) ABSTRACT

A lifting device for lifting components of a wind turbine. The lifting device has at least a first and second fastening unit in each case for fastening a component of a wind turbine and a first arm having a plurality of bores. The bores have different angles relative to the first and second fastening unit.

6 Claims, 49 Drawing Sheets

(52) U.S. Cl.
CPC ..... *F05B 2220/706* (2013.01); *F05B 2230/61* (2013.01); *Y02E 10/726* (2013.01); *Y02P 70/523* (2015.11)

(56) References Cited

U.S. PATENT DOCUMENTS

| | | |
|---|---|---|
| 9,522,626 B2 | 12/2016 | Hansen et al. |
| 9,534,416 B2 | 1/2017 | Ohlen et al. |
| 10,093,520 B2 | 10/2018 | Westergaard |
| 10,119,519 B2 | 11/2018 | Meyer et al. |
| 2009/0324380 A1 | 12/2009 | Pedersen |
| 2010/0150684 A1 | 6/2010 | Pedersen et al. |
| 2016/0040649 A1 | 2/2016 | Smith et al. |

FOREIGN PATENT DOCUMENTS

| | | | |
|---|---|---|---|
| CN | 103987957 A | 8/2014 | |
| CN | 105083963 A | 11/2015 | |
| CN | 105121327 A | 12/2015 | |
| DE | 102009011478 A1 | 9/2010 | |
| DE | 102011003164 A1 | 7/2012 | |
| DE | 202012005409 U1 * | 9/2013 | ............. B66C 1/24 |
| DE | 202012005409 U1 | 10/2013 | |
| EA | 20977 B1 | 3/2015 | |
| EP | 2118483 B1 | 8/2010 | |
| JP | H06227786 A | 8/1994 | |
| JP | 2012-184110 A | 9/2012 | |
| RU | 2377438 B2 | 12/2009 | |
| RU | 2014117957 A | 11/2015 | |
| WO | 2011064659 A2 | 6/2011 | |

\* cited by examiner

LIFTING DEVICE FOR LIFTING A COMPONENT OF A WIND TURBINE AND METHOD FOR ASSEMBLING COMPONENTS OF A WIND TURBINE

BACKGROUND

Technical Field

The present invention relates to a lifting device for lifting a component of a wind turbine as well as to a method for assembling components of a wind turbine.

Description of the Related Art

After the tower has been erected, all parts of the wind turbine, which are to be provided in or on the rotor of the wind turbine, have to be transported or lifted upwards, respectively, by means of a crane. This transport, however, is cost-intensive and depends on the prevailing weather conditions.

In the German patent application, which forms the priority, the German Patent and Trademark Office has researched the following documents: DE 10 2009 011 478 A1 and DE 10 2011 003 164 A1.

BRIEF SUMMARY

Provided is a lifting device for lifting components of a wind turbine as well as a method for assembling components of a wind turbine, which provides for a quicker assembly of the components of the wind turbine.

A lifting device for lifting components of a wind turbine is thus provided. The lifting device has at least a first and second fastening unit in each case for fastening a component of a wind turbine and a first arm having a plurality of bores. The bores have different angles relative to the first and second fastening unit.

According to one aspect of the present invention, the first arm is at least partially arranged at an angle relative to the first and second fastening unit.

According to a further aspect of the present invention, a carriage is provided, which can be secured in particular along the first arm in one of the plurality of the bores. The carriage has a tab or eye for accommodating a crane hook.

According to a further aspect of the present invention, the lifting device has a second and third arm, on which a first part of the first and second fastening unit can in each case be provided. The lifting device further has a bottom unit, which has two second parts of the first and second fastening unit. The two second parts of the fastening units are pivotably provided on the bottom unit and can have an operating position and a transport position.

According to a further aspect of the present invention, the first arm has a first straight and a second angled section.

According to a further aspect of the present invention, the first and second fastening unit is arranged substantially parallel to one another.

Provided is a further lifting device for lifting components of a wind turbine. The lifting device has at least one first fastening unit for fastening a component of a wind turbine, and a second fastening unit for fastening a further component of the wind turbine. The first fastening unit has a first eye for a crane hook, and the second fastening unit has a second eye for a crane hook. The lifting device further has a first arm at an angle relative to the first and second fastening unit having a third eye for a crane hook. The first and second fastening unit is arranged at an angle of <90°, in particular substantially 60° relative to one another.

Provided is a lifting device for lifting components of a wind turbine, which has at least a first and second fastening unit in each case for fastening a component of a wind turbine. The first and second fastening unit is arranged substantially parallel to one another. The lifting device further has an arm having an eye for a crane hook, wherein the arm is provided so as to be pivotable with respect to the first and second fastening unit.

Provided is a method for assembling components of a wind turbine to a wind turbine by means of an above-described lifting device. At least a first and second component of a wind turbine is fastened to the at least first and second fastening unit of the lifting device. The carriage is locked in a bore, so that a crane hook, which is fastened to the carriage, is oriented substantially perpendicular to the first and second fastening unit. One of the components of the wind turbine, which is fastened to the first or second fastening unit, is fastened to a first rotor hub connection, which is in the 3 o'clock position. The component of the wind turbine is released from the first and second fastening unit and the carriage is displaced and is locked in a further bore, which is located between the first and second fastening unit. The lifting device is pivoted, lifted, turned and displaced to the outside about an angle, so that the second component of the wind turbine, which is still fastened to the first or second fastening unit, can be fastened to a second rotor blade connection. The component of the wind turbine, which is fastened to the lifting device, is fastened to the second rotor hub connection. The component of the wind turbine is released from the first and second fastening unit.

BRIEF DESCRIPTION OF THE SEVERAL VIEWS OF THE DRAWINGS

Further embodiments of the invention are the subject matter of the subclaims. Advantages and exemplary embodiments of the invention will be described in more detail below with reference to the drawings.

DETAILED DESCRIPTION

Figure 1:
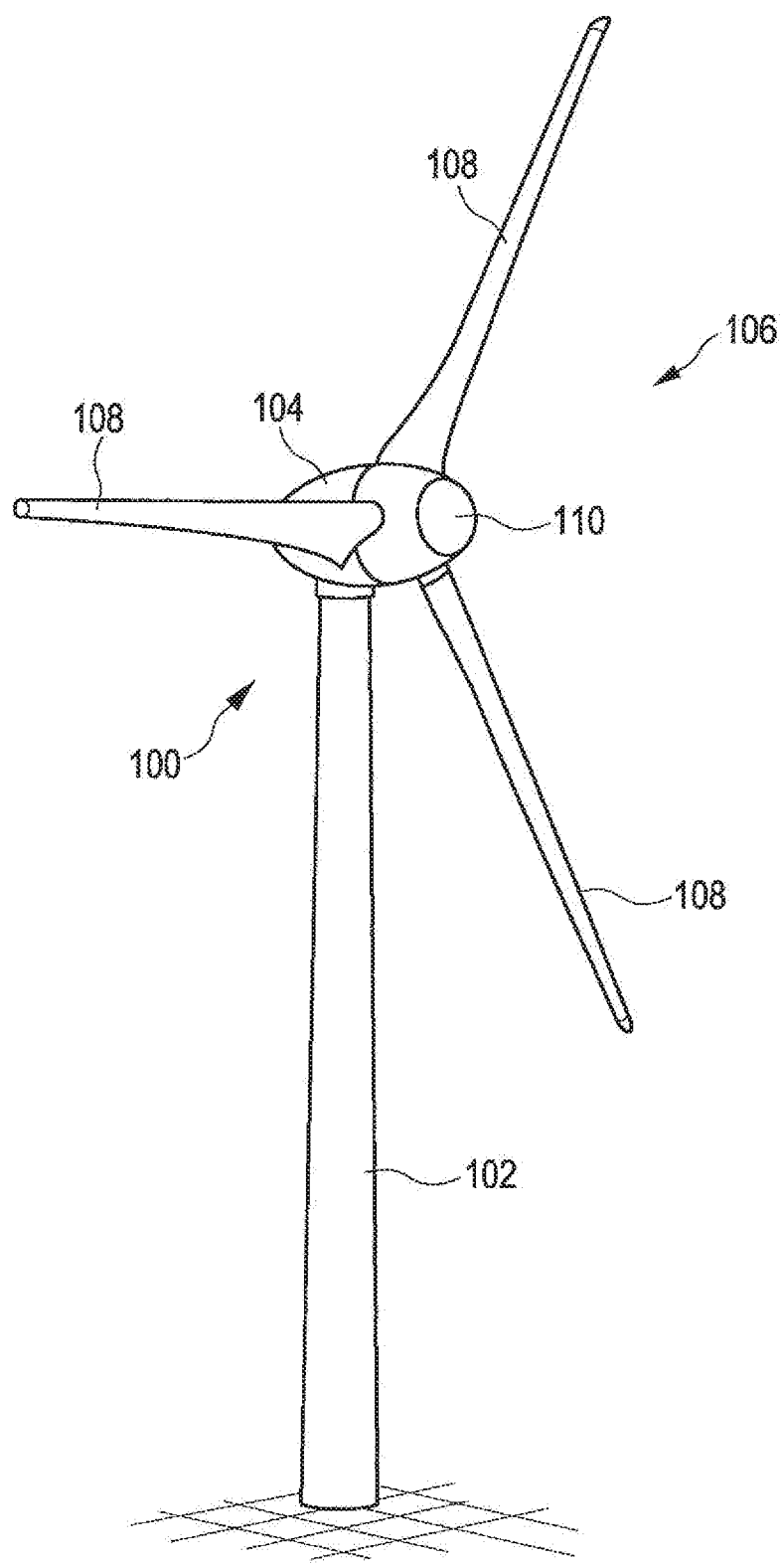
FIG. 1 shows a perspective view of a wind turbine.

FIG. 1 shows a wind turbine 100 having a tower 102 and a nacelle 104. A rotor 106 having three rotor blades 108 and a spinner 110 is arranged at the nacelle 104. During operation, the wind sets the rotor 106 into a rotary motion and thus drives a generator in the nacelle 104. The rotor blades 108 can be fastened to a rotor hub of the wind turbine, for example by means of a blade connection or blade adapter. The rotor hub can have three rotor hub connections. The rotor blades of the wind turbine can be pitched for example by means of a pitch bearing, i.e., they can be rotated about their longitudinal axis.

Figure 2:
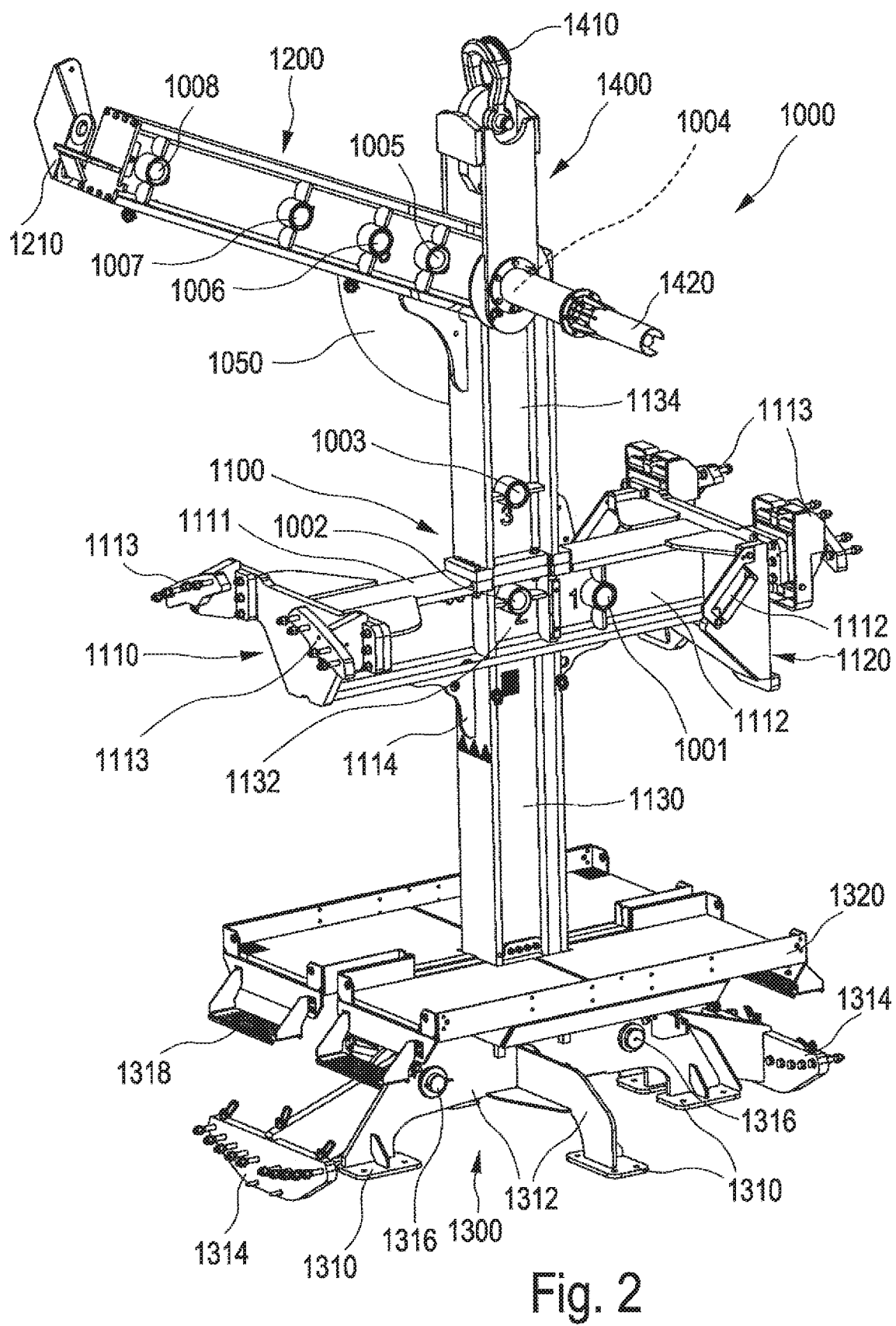
FIG. 2 shows a perspective view of an embodiment of a lifting device according to the invention.

FIG. 2 shows a lifting device 1000, which can be used to erect the wind turbine 100 or to assemble components of a wind turbine, which are to preferably be assembled in the rotor or in the nacelle. The lifting device 1000 has substantially a first section 1100 and a second section 1200. If the device 1000 stands on a ground, the first section 1100 is oriented substantially vertically with respect to the bottom surface, while the second section 1200 is arranged at an angle 1150 relative to the first section 1100.

The first section 1100 is formed substantially of a so-called I-beam (or double T-beam, respectively). A first fastening unit 1110 and a second fastening unit 1120 are arranged at the first section 1100. The fastening units 1110 and 1120 serve to fasten different components of the wind turbine 100 during the lifting to a designated height and during the assembly or disassembly on the wind turbine. The first and the second fastening unit 1110, 1120 are preferably arranged on opposite sides of the first section 1100. The fastening units 1110, 1120 are in each case arranged at one end of a respective arm 1111, 1112, which protrudes from the first section 1100. The arms 1111, 1112 are also formed substantially of an I-beam and are arranged at the same height. The fastening units 1110, 1120 have upper fastening plates 1113, to which the respective component, which is to be fastened, is to be fastened. The fastening units 1110 and 1120 can be embodied differently. In the shown embodiment, the fastening unit 1120 additionally has an accommodation 1122 for a round sling, for example, which will be discussed below.

At an upper end, the second section 1200 connects the first section 1100. The second section 1200 protrudes from the first section 1100 at an angle 1150. The angle can thereby be chosen arbitrarily. For a field of application of the device 1000, which will be described below, an angle 1150 of approximately 120° (or 60°, respectively) between the orientation of the first section 1100 and of the second section 1200 has turned out to be advantageous. The second section 1200 is substantially also formed by an I-beam. A stiffening bracket, which increases the stiffness of the device 1000, is inserted between the first section 1100 and the second section 1200. A base part 1210 is arranged at an outer end of the second section 1200.

A bottom section 1300 is arranged at another end of the first section 1100. The bottom section 1300 forms, e.g., a cross-shaped frame, which is consists of at least four base arms 1312. During the fastening of the components to the fastening units 1110, 1120, the device 1000 rests or stands, respectively, on bases 1310, which are arranged at the bottom section 1300.

Lower fastening plates 1314 of the fastening units 1110, 1120 are arranged at opposite base arms 1312. The lower fastening plates 1314 are thereby arranged on the same sides as the fastening units 1110 and 1120. The lower fastening plates 1314 are embodied in a foldable manner. The fastening arrangements 1314 can thus be folded during the transport of the device 1000, whereby the transport space is reduced. The device 1000 can furthermore also be tilted with respect to the component fastened thereto, if the component is only fastened to the lower fastening plate. For this purpose, the base arms 1312, at which the lower fastening plates 1314 are arranged, are in each case embodied in two parts, so that a mechanism 1316 for folding is arranged between the respective two parts of the corresponding base arm 1312. The folding mechanism is realized substantially by means of a pin, on which the lower fastening plates 1314 are rotatably supported.

At the first section 1100, a working landing 1320 is arranged in the area of the bottom section 1300. During the assembly of the parts, which are to be fastened, workers can stand on the working landing 1320 at the wind turbine 100. The working landing 1320 provides a working platform, which is completely passable around the first section 1100. To more easily reach the working landing 1320, steps 1318 are attached to the sides.

The first section 1100 consists of several parts. A first part 1130, which consists of an I-beam, connects the bottom section 1300 to a second part 1132. The second part 1132 is connected to the first part 1130, for example via a welding, and is arranged substantially perpendicular thereto. The second part 1132 also has the arms 1111, 1112, at which the upper fastening plates 1113 of the fastening units 1110 and 1120 are arranged. Stiffening brackets 1114 between the first and second part 1130, 1132 of the first section 1100 increase the stiffness of the second part 1132. A third part 1134 of the first section, which connects the second part 1132 to the second section 1200, is arranged above the second part 1132, in extension of the first part 1130. The third part 1134 can thereby be flanged to the second part 1132 by means of a plurality of screws. The device 1000 can be disassembled further in this way during the transport, in order to save transport space. The first, second and third part 1130, 1132, 1134, however, can also be connected to one another by means of any other suitable type of connection.

The first and second section 1100, 1200 of the device 1000 have a plurality of locking bores 1001 to 1008. A first locking bore 1001 is arranged in the arm 1112 of the second part 1132 of the first section 1100. A second locking bore 1002 is arranged in a connection area of the first, second and third part 1130, 1132, 1134 in the first part 1130 of the first section 1100. A third locking bore 1003 is arranged in an upper area of the first section 1100 in the third part 1134. A fourth locking bore 1004 is arranged at the upper end of the first section 1100 in the transition to the second section 1200. More precisely, the fourth locking bore 1004 is arranged in an intersection point of the longitudinal axis of the first section 1100 with the longitudinal axis of the second section 1200. A fifth, sixth and seventh locking bore are arranged along the second section 1200 at distances to one another. An eighth locking bore 1008 is arranged at the outer end of the second section 1200. The locking bores 1001 to 1008 in each case have a ring, which protrudes beyond a web of the I-beam and which increases a width or length, respectively, of the locking bore 1001 to 1008. The ring is reinforced with stiffening ribs between ring and belt or flange, respectively, of the I-beam.

Figure 3:
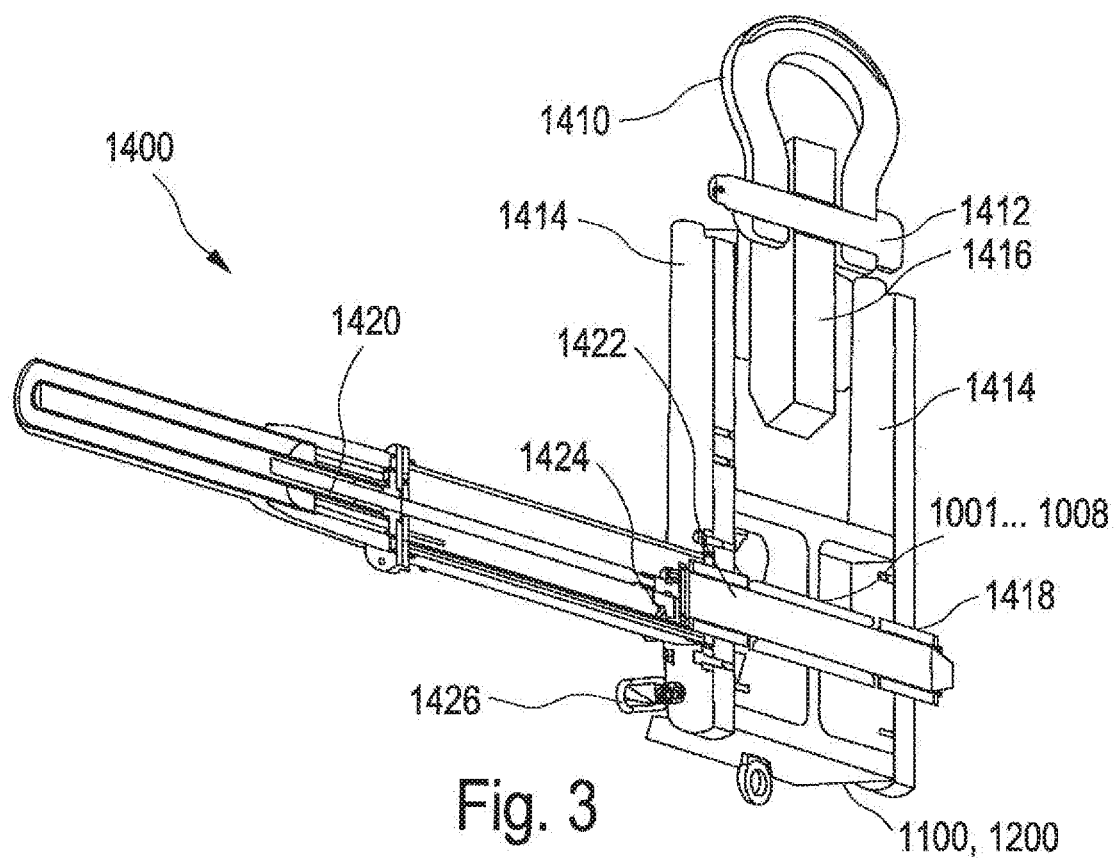
FIG. 3 shows a perspective sectional view of an embodiment of a carriage of the lifting device according to the invention of FIG. 2.

FIG. 3 shows a perspective sectional view of a carriage of the lifting device of FIG. 2. Along the first and second section 1100, 1200, a displaceable carriage 1400 can be arranged, which can be locked in the locking bores 1001 to 1008, which can thus be secured in the locking bores 1001 to 1008 so that it cannot slide. The carriage 1400 is rotatably supported in the locking bores 1001 to 1008. To secure against a releasing of the carriage 1400 in one of the locking bores 1001 to 1008, the carriage 1400 has a hydraulic cylinder 1420, which secures a load pin 1422 in the respective locking bore 1001 to 1008. A tab 1410, to which for example a crane hook can be hooked, in order to lift the device 1000, is arranged at the carriage 1400.

The tab 1410 is fastened to the carriage 1400 by means of a pin 1412. For this purpose, the carriage 1400 has two cross webs, which are attached between base bodies 1414 of the carriage 1400. A plate 1415, at which the tab 1410 is arranged, is attached between the cross webs. The base bodies 1414 of the carriage 1400 in each case run on both sides of the first and second section 1100, 1200 and have an accommodating bore 1418, which accommodates a load pin 1422. The load pin 1422 is inserted into the accommodating bores 1418 and the locking bores 1001 to 1008 of the first or second section 1100, 1200, respectively, to secure the carriage 1400. To secure the load pin 1422, the hydraulic cylinder 1420 is provided, which is attached to a cylinder screw 1424, which serves as so-called positioning flag. In addition, a threaded lifting eye 1426 is attached to one of the base bodies 1414 to manually pull the carriage 1400 into position.

Figure 4:
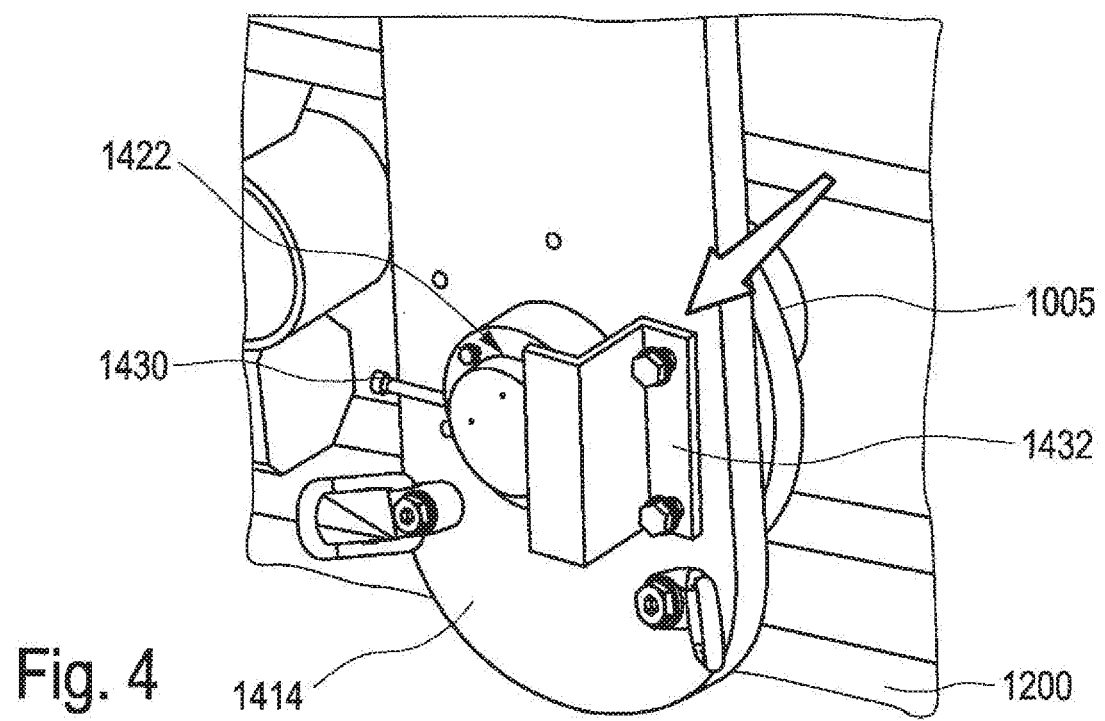
FIG. 4 shows a perspective view of a pin retainer for the carriage from FIG. 3.

An exemplary alternative for the hydraulic pin retainer from FIG. 3 is illustrated in FIG. 4. If the hydraulic cylinder is not used, a pin retainer having a securing pin 1430 and a securing plate 1432 can be used to secure the load pin 1422 for example in the locking bore 1005 of the second section 1200. The securing pin 1430 is thereby laterally inserted into the load pin 1422. The securing plate 1432 is embodied substantially Z-shaped and is fastened to the base body 1414, for example by means of a screw connection.

Figure 5:
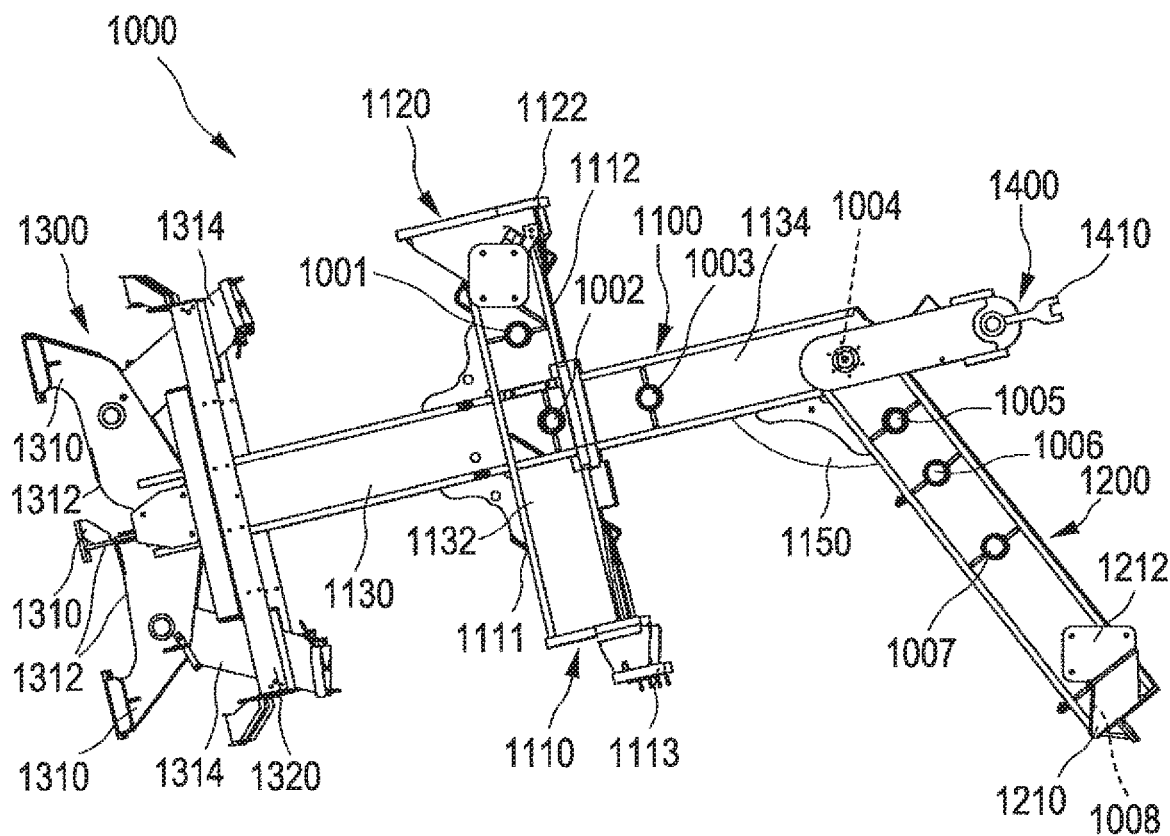
FIG. 5 shows a bottom view of a transport position of the lifting device of FIG. 2, FIGS. 6a and 6b show enlarged perspective views of the lifting device of FIG. 2 in transport position.
Figure 6A:
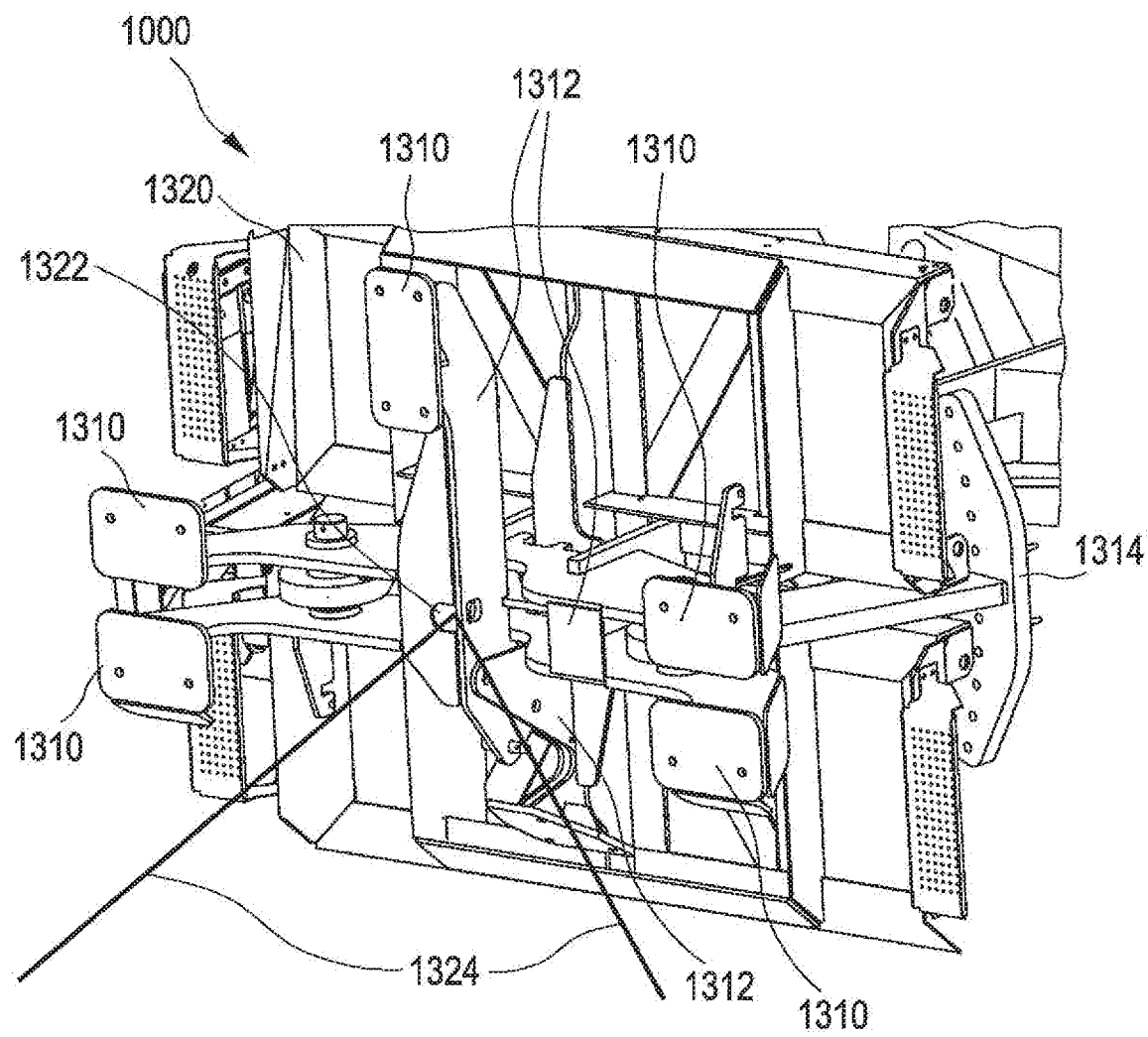
Figure 6B:
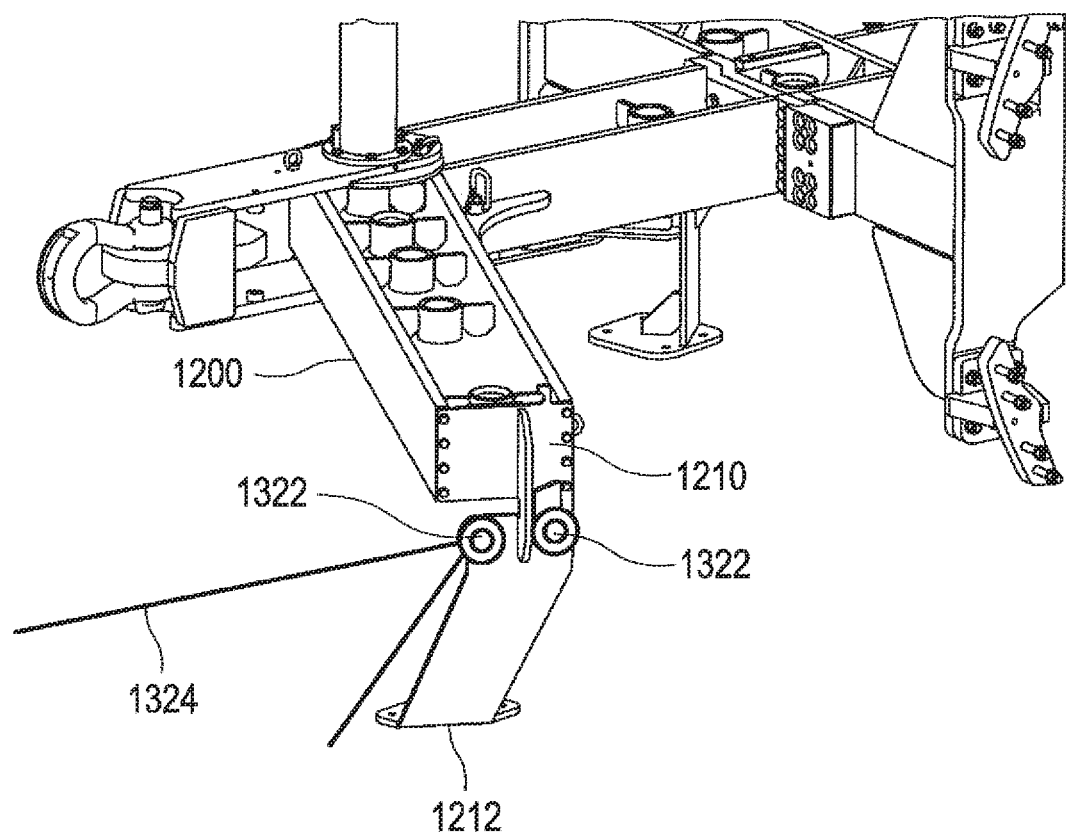

FIG. 5 shows a bottom view onto a transport position of the device 1000. In a broader sense, FIG. 5 represents a side view of the device 1000 and thus substantially shows the features of the device 1000, which have already been described in FIG. 2. During the transport, the device 1000 is located on one side. The device 1000 is thereby supported on a side surface of the working landing 1320 and on a base 1212, which is arranged at the head part 1210. As can be seen in FIG. 5, the lower fastening plates 1314 of the fastening units 1110, 1120, which are arranged at the bottom section 1300, can be folded during the transport of the device 1000. The lower fastening plates 1314 are folded substantially upwards for this purpose and reach into a gap in the working landing 1320 provided for this purpose, as can also be seen in FIG. 6a. A so-called splicing point 1322, to which a fastening means 1324, for example a securing strap, for securing the device 1000 in the transport position can be fastened, is located at one of the base arms 1312. In one embodiment, at least one base arm 1312, for example the base arm 1312, which is directed towards the supporting side, is also folded up. Further splicing points 1322 are located on the head part 1210, among others, on the outer end of the second section 1200 (see FIG. 6b), at which the base 1212 is arranged.

Figure 7A:
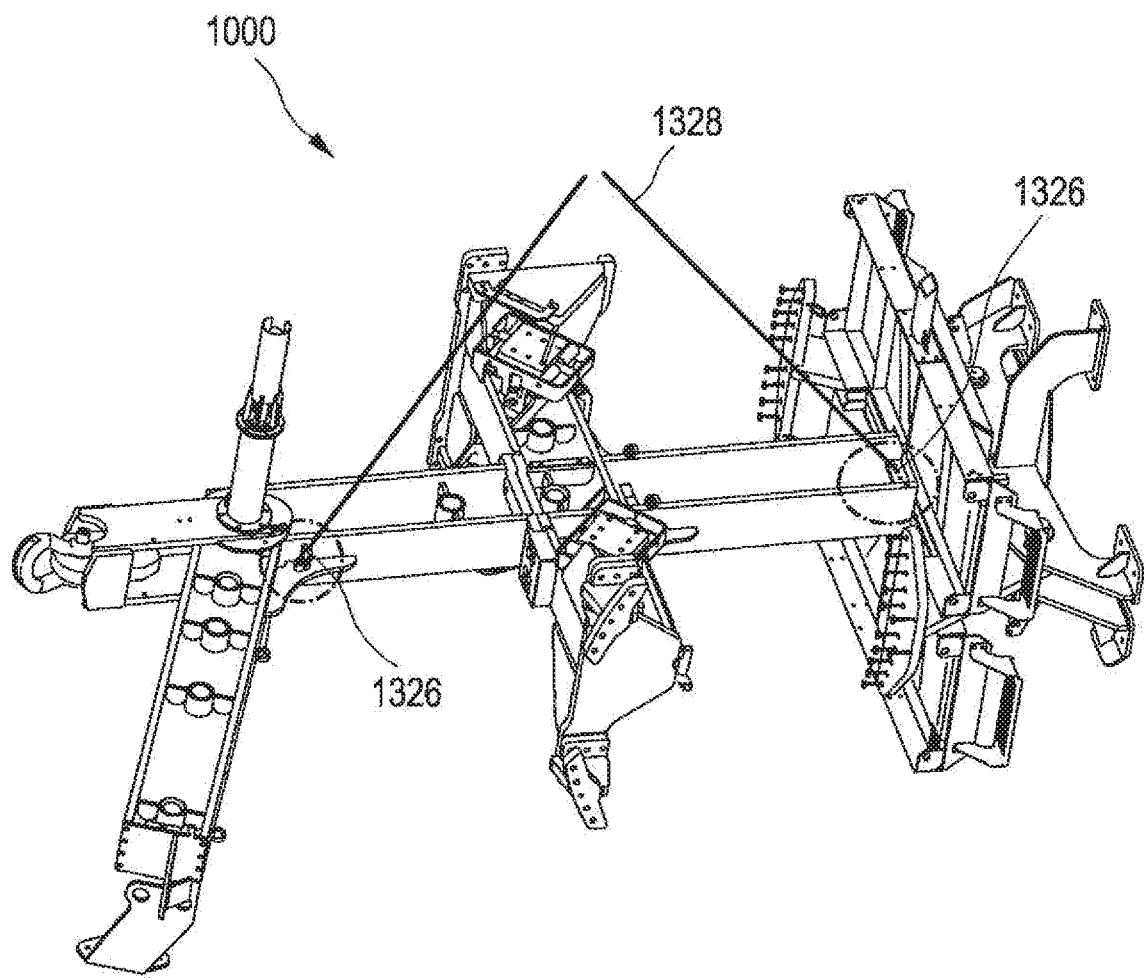
FIGS. 7a and 7b show enlarged views of the lifting device of FIG. 2 in transport position.
Figure 7B:
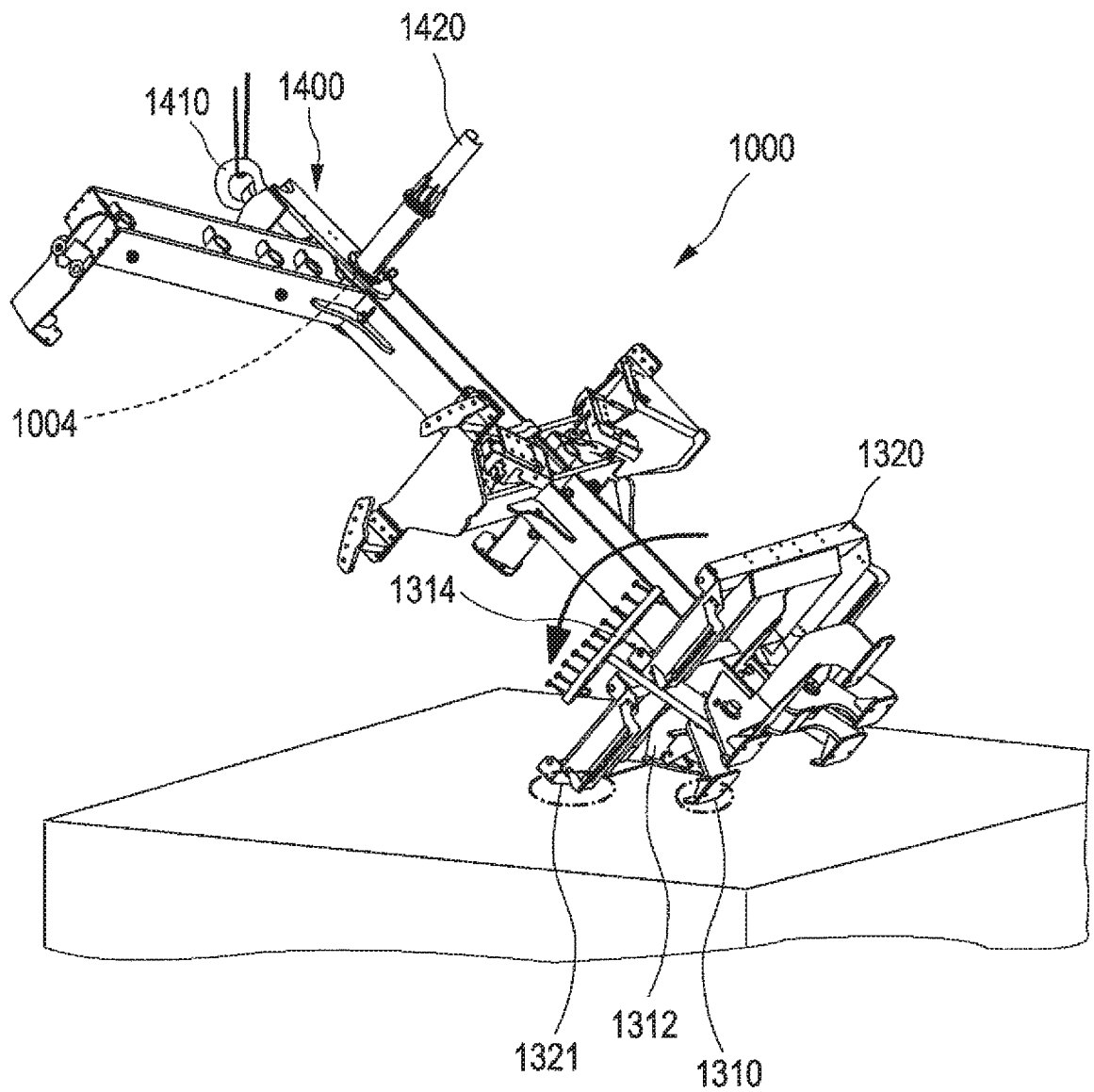

With reference to FIGS. 7a and 7b, the lifting of the device 1000 out of the transport position shown in FIG. 5 is described. To lift the device 1000 out of the lateral transport position, the device 1000 has at least two lifting points 1326. Round slings 1328 or ropes, belts or the like, which are guided for example to a crane hook, by means of which the device 1000 is then lifted, can be fastened to the lifting points 1326.

FIG. 7b shows the arrangement of the device 1000 and of the fastening means for tilting the device. For this purpose, the carriage 1400 is bolted and secured in the locking bore 10004. In addition, at least one base arm 1312, namely the one, to the side of which the device 1000 is to be tilted, and the lower fastening plates 1314 are folded up and are secured in the respective position. On the tab 1410, the device 1000 is connected via suitable means to a crane, which then lifts the device 1000 out of the lateral position or guides it into the lateral position (see arrow direction). The device 1000 thereby tilts across an edge 1321 of the working landing 1320 and a base 1310. The device 1000 is tilted in such a way, so that the hydraulic cylinder 1420 protrudes upward in the lateral lying position or transport position, respectively.

Figure 8A:
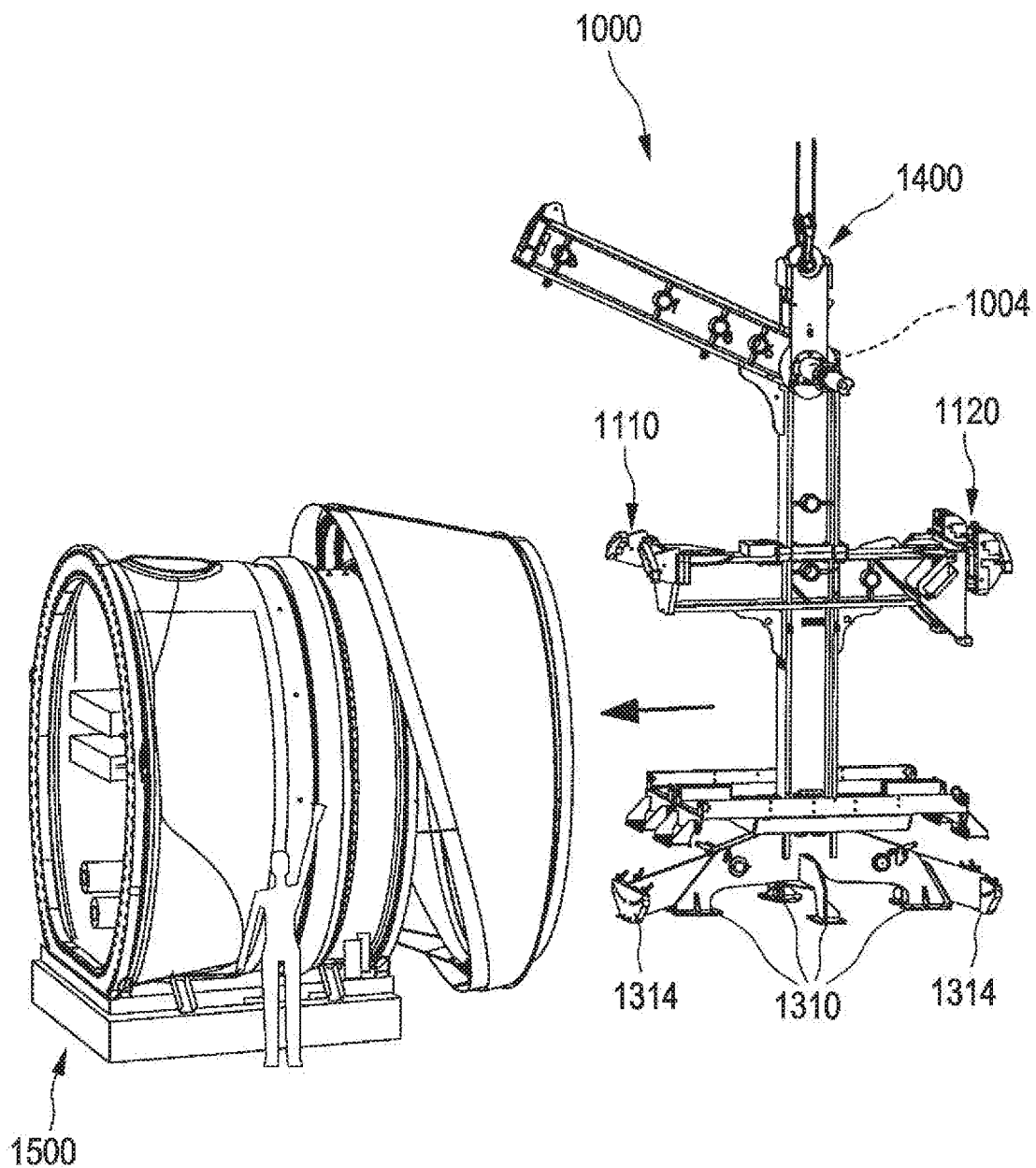
FIGS. 8a to 8u show views of method steps of the assembly method according to a first exemplary embodiment.
Figure 8B:
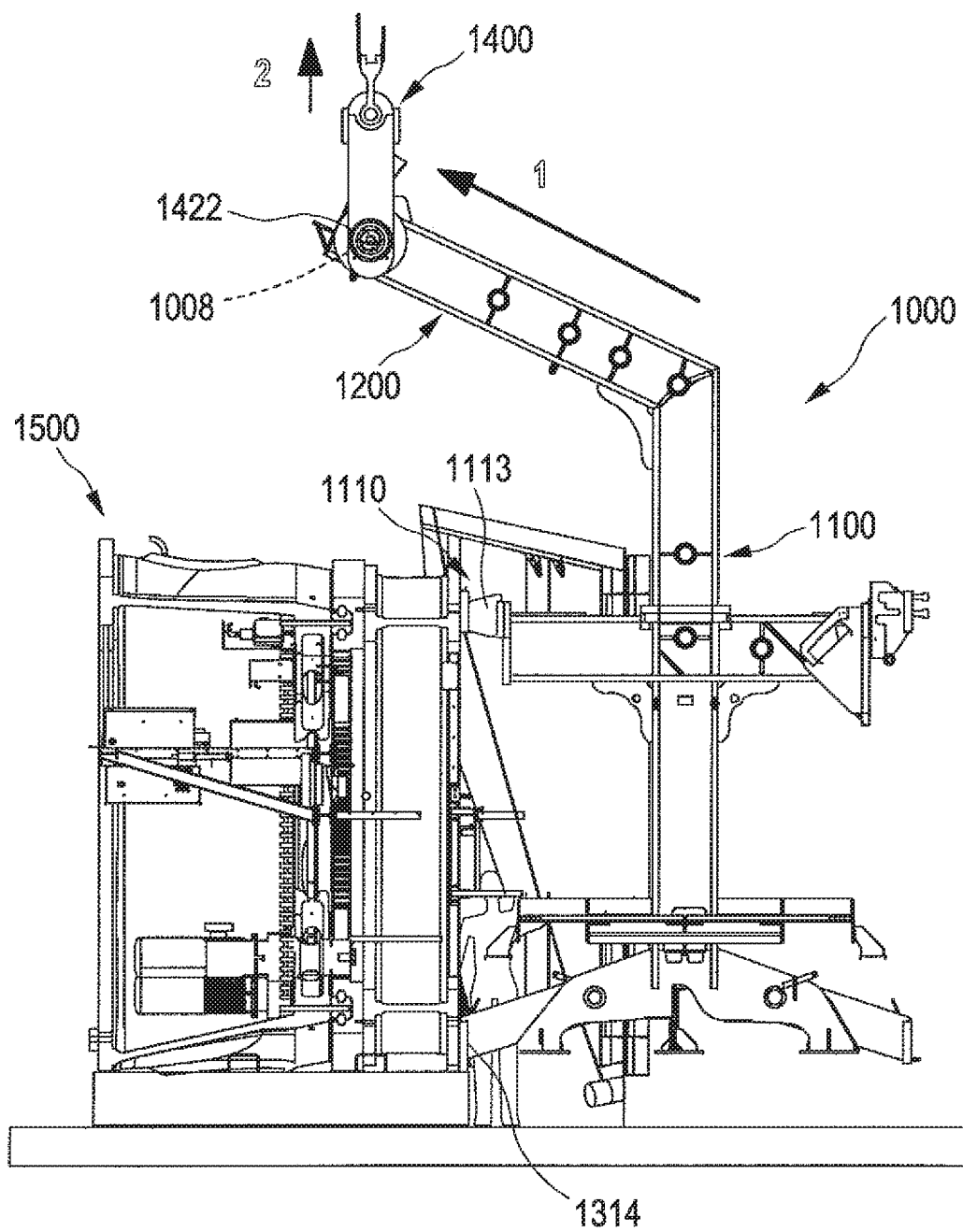
Figure 8C:
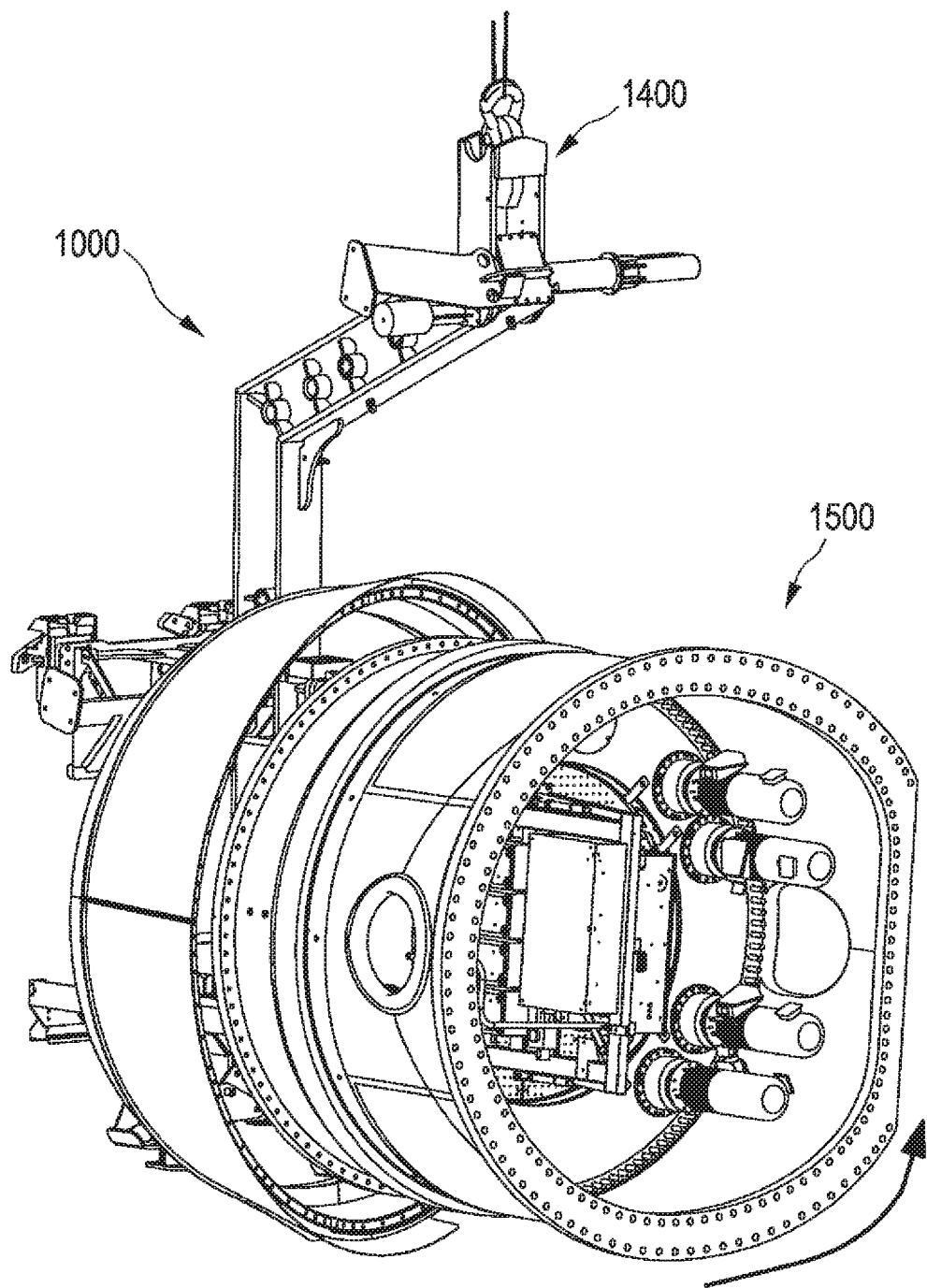
Figure 8D:
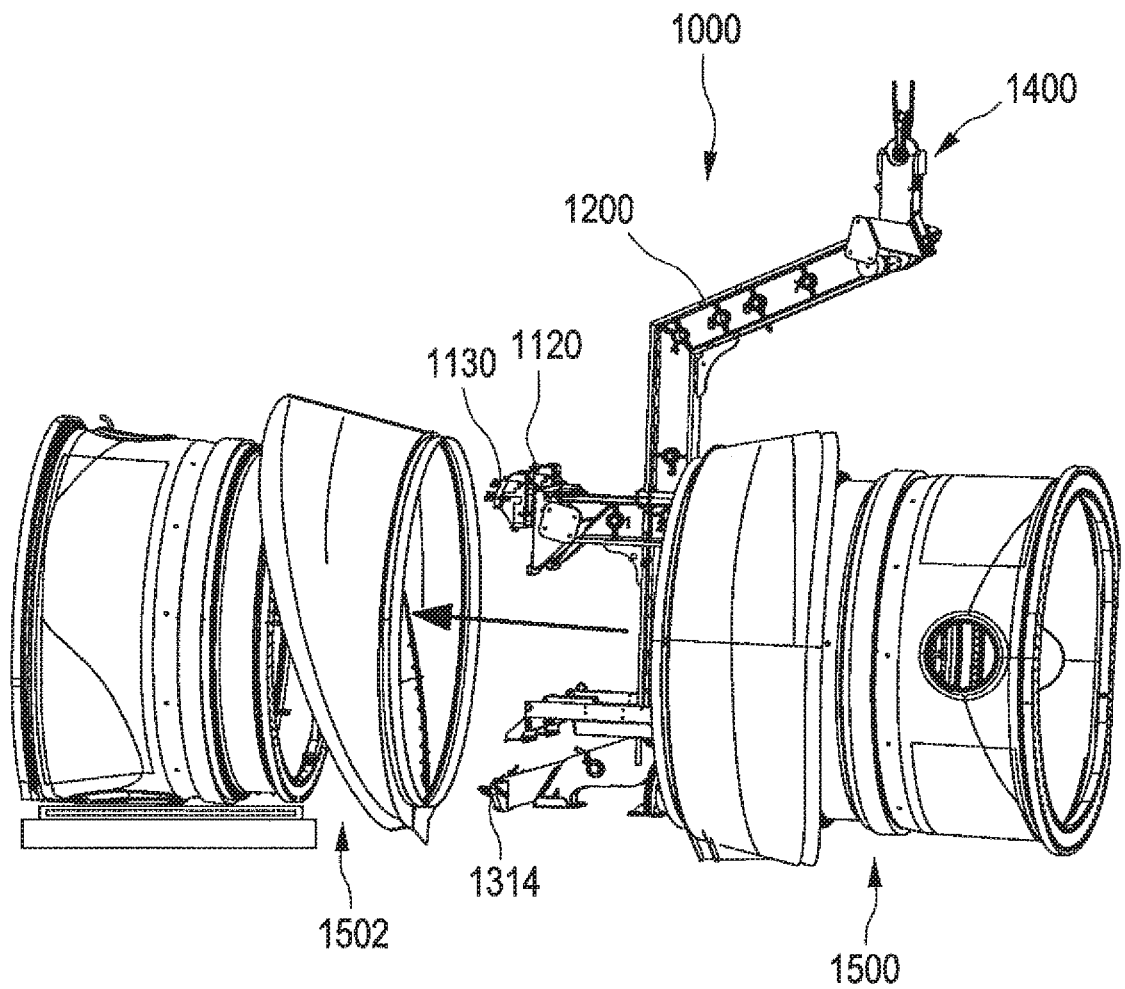
Figure 8E:
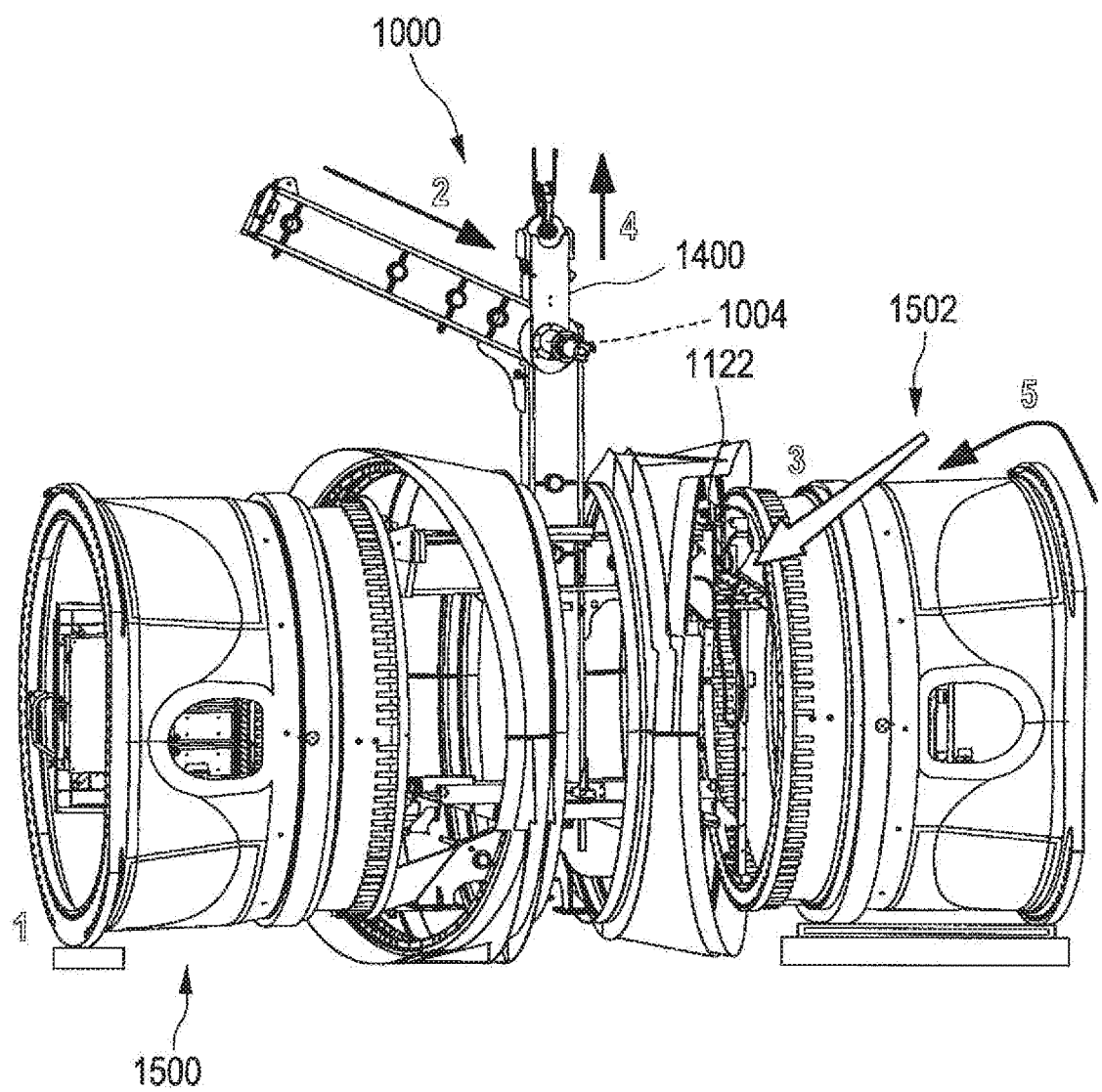
Figure 8F:
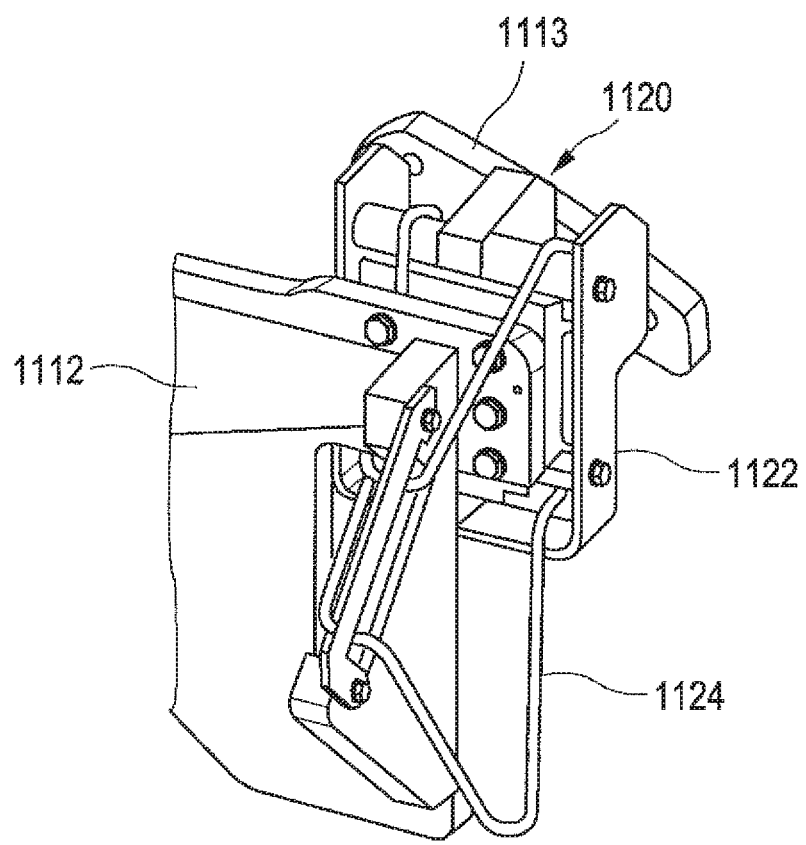
Figure 8G:
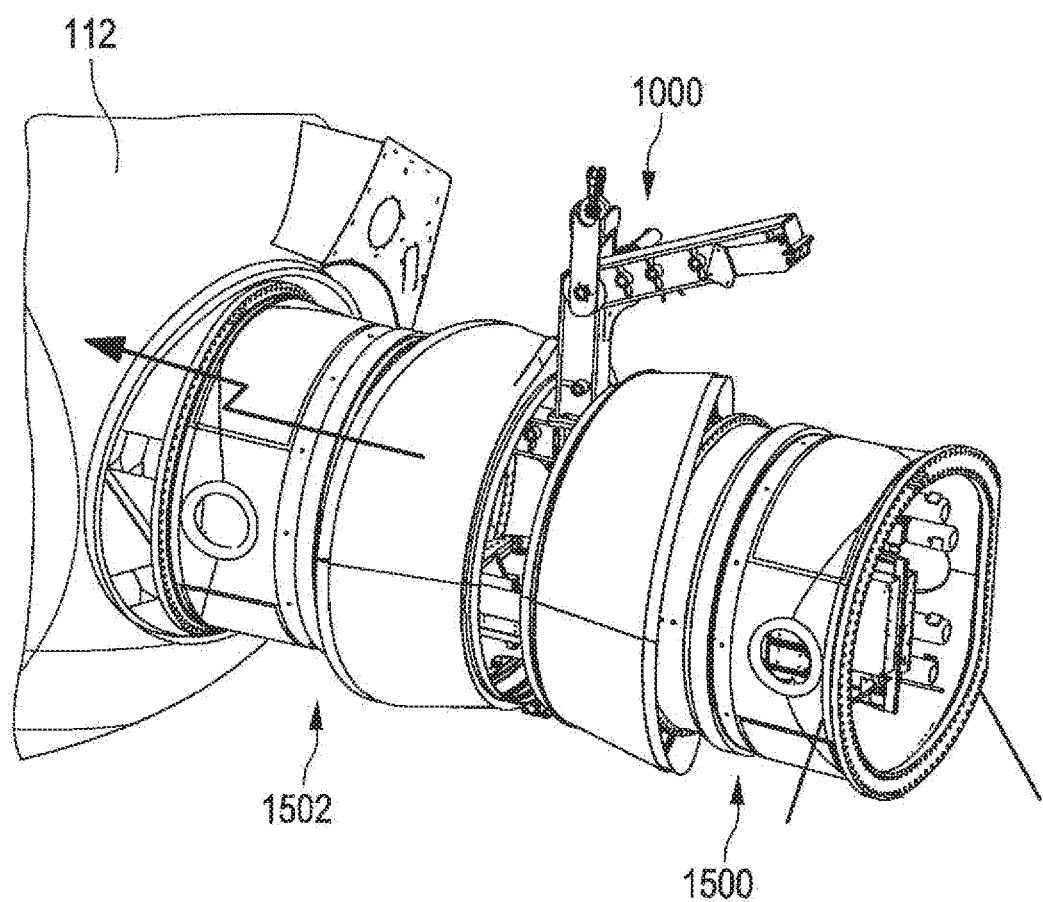
Figure 8H:
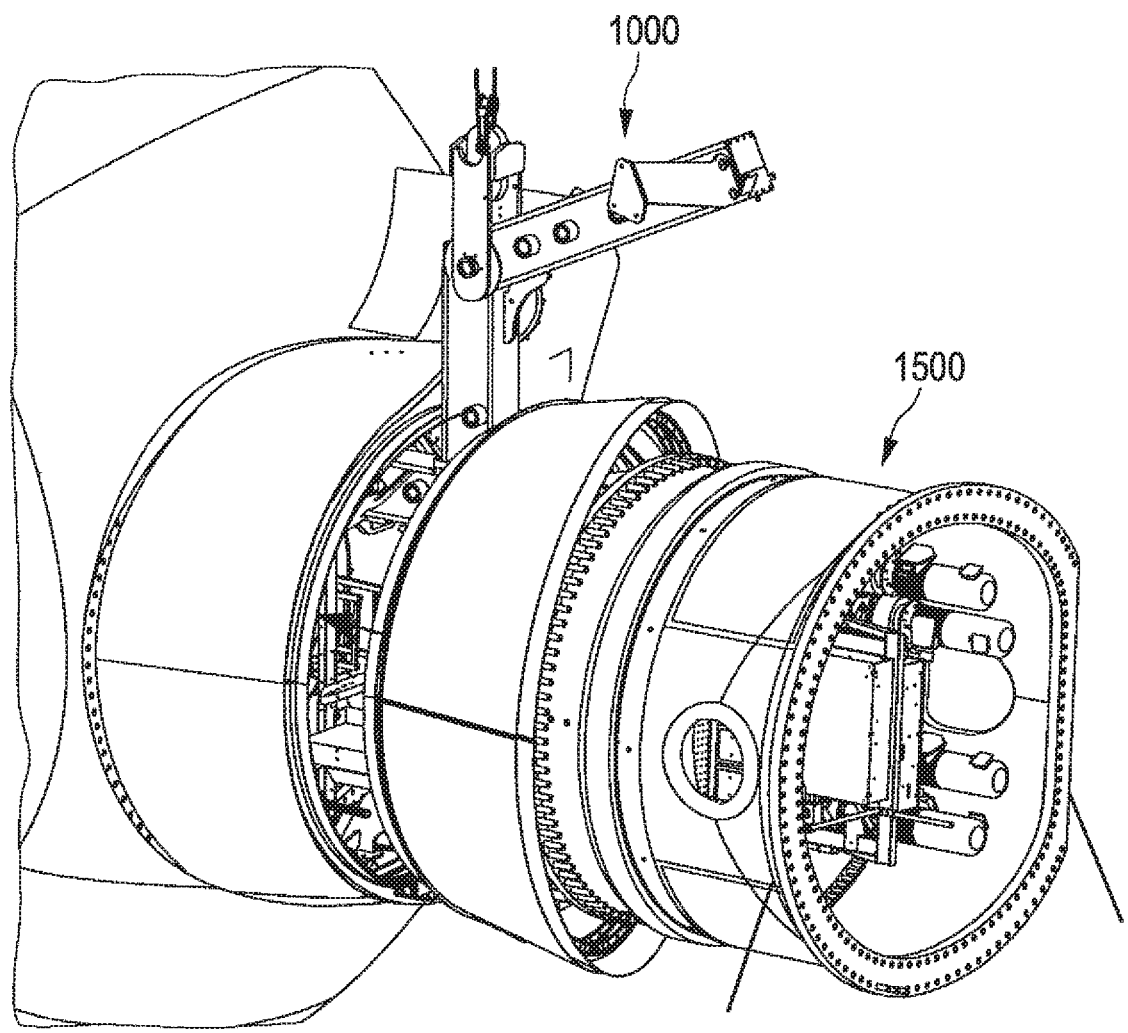
Figure 8I:
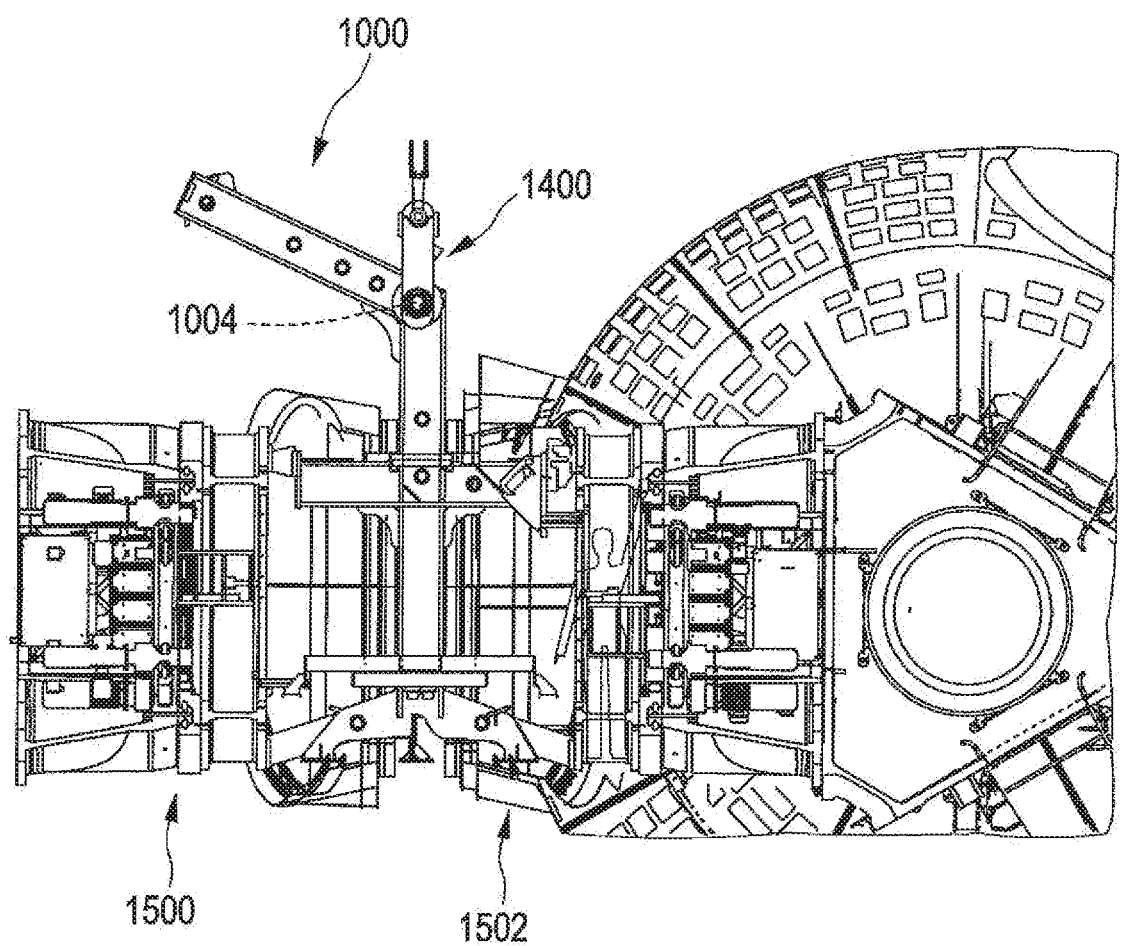
Figure 8J:
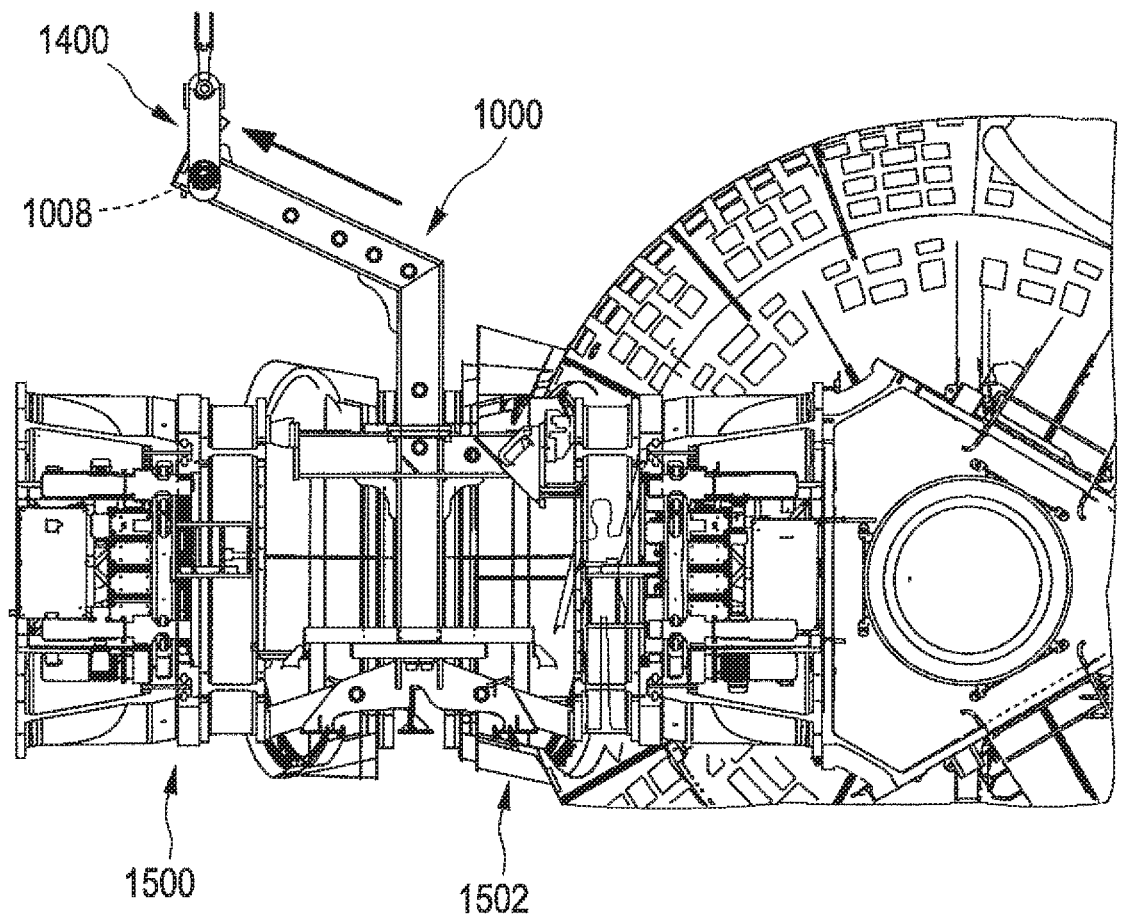
Figure 8K:
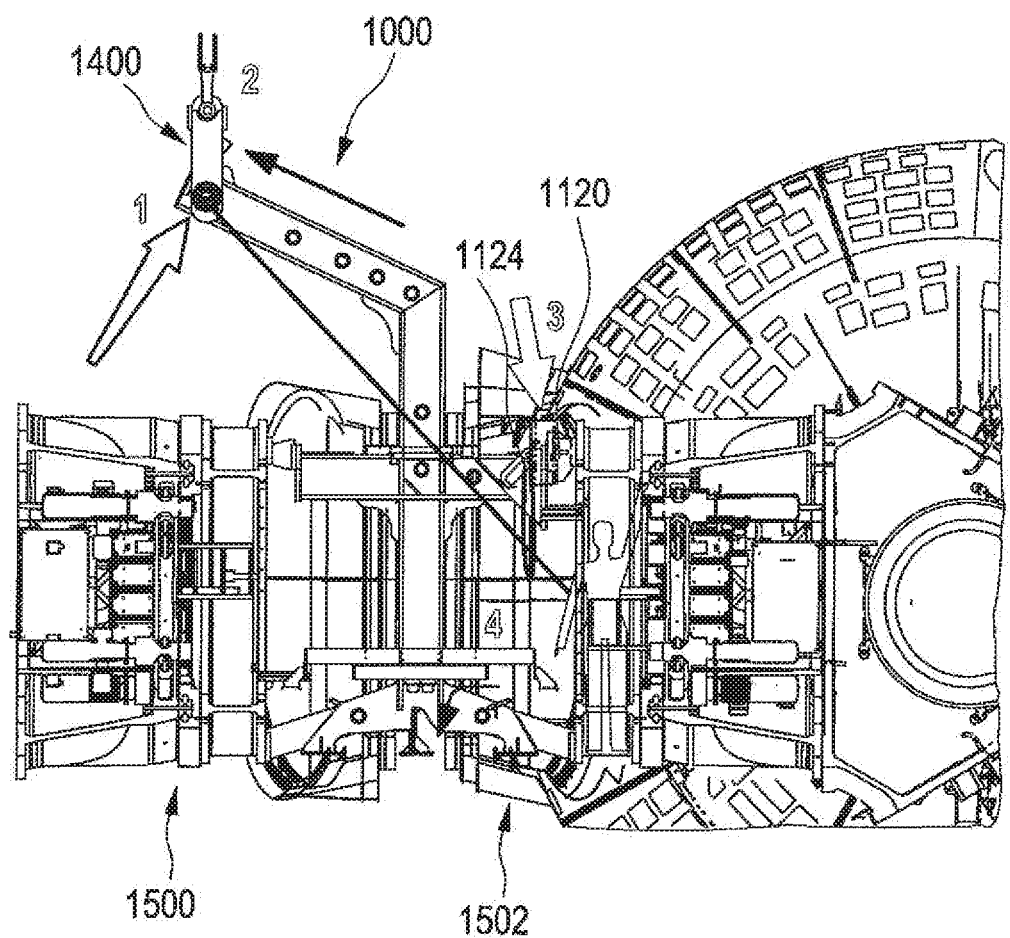
Figure 8I:
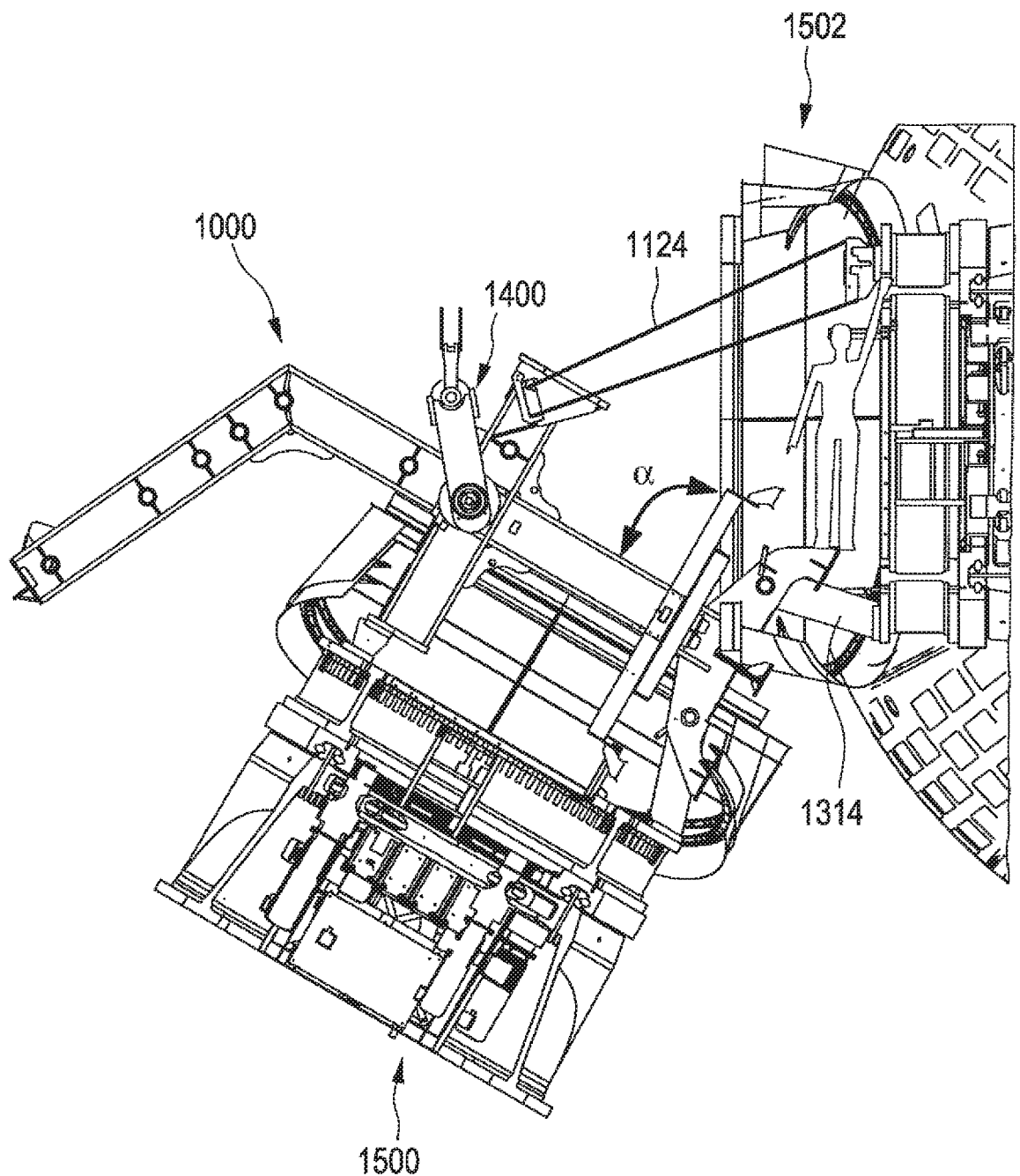
Figure 8M:
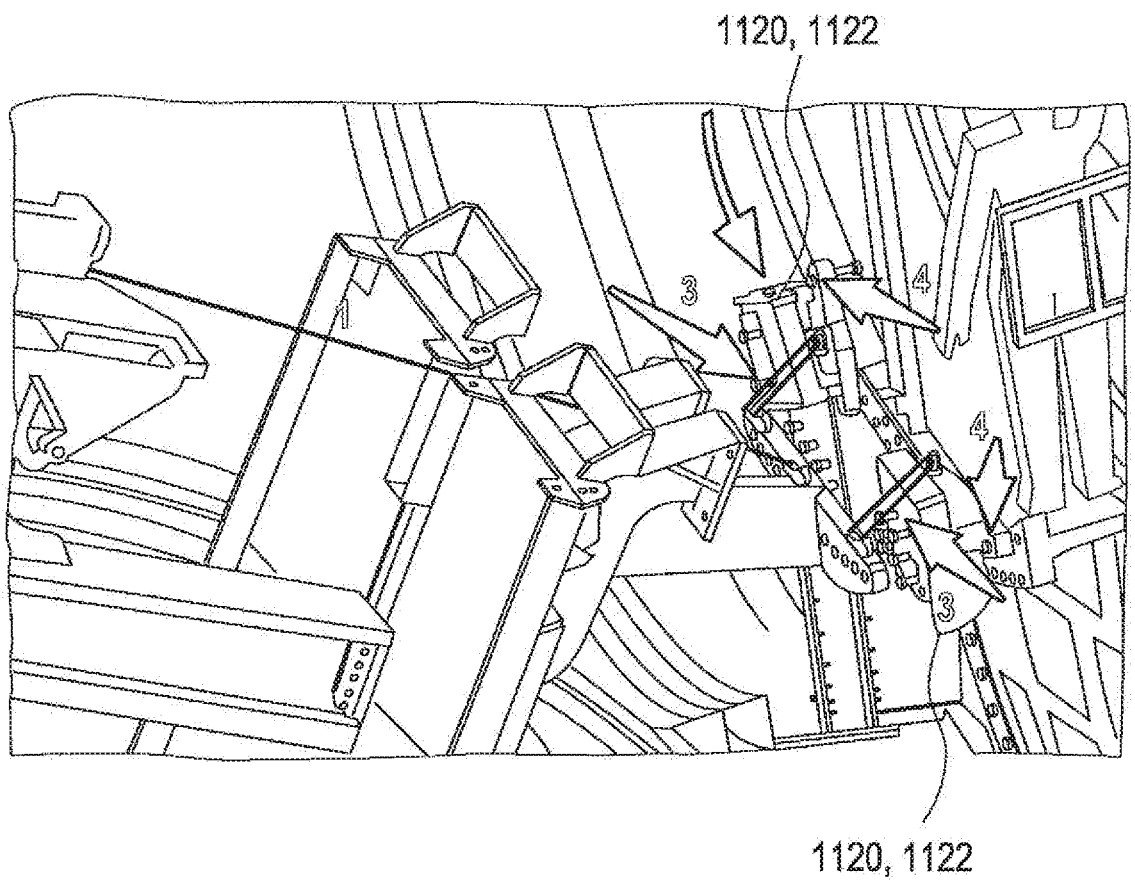
Figure 8N:
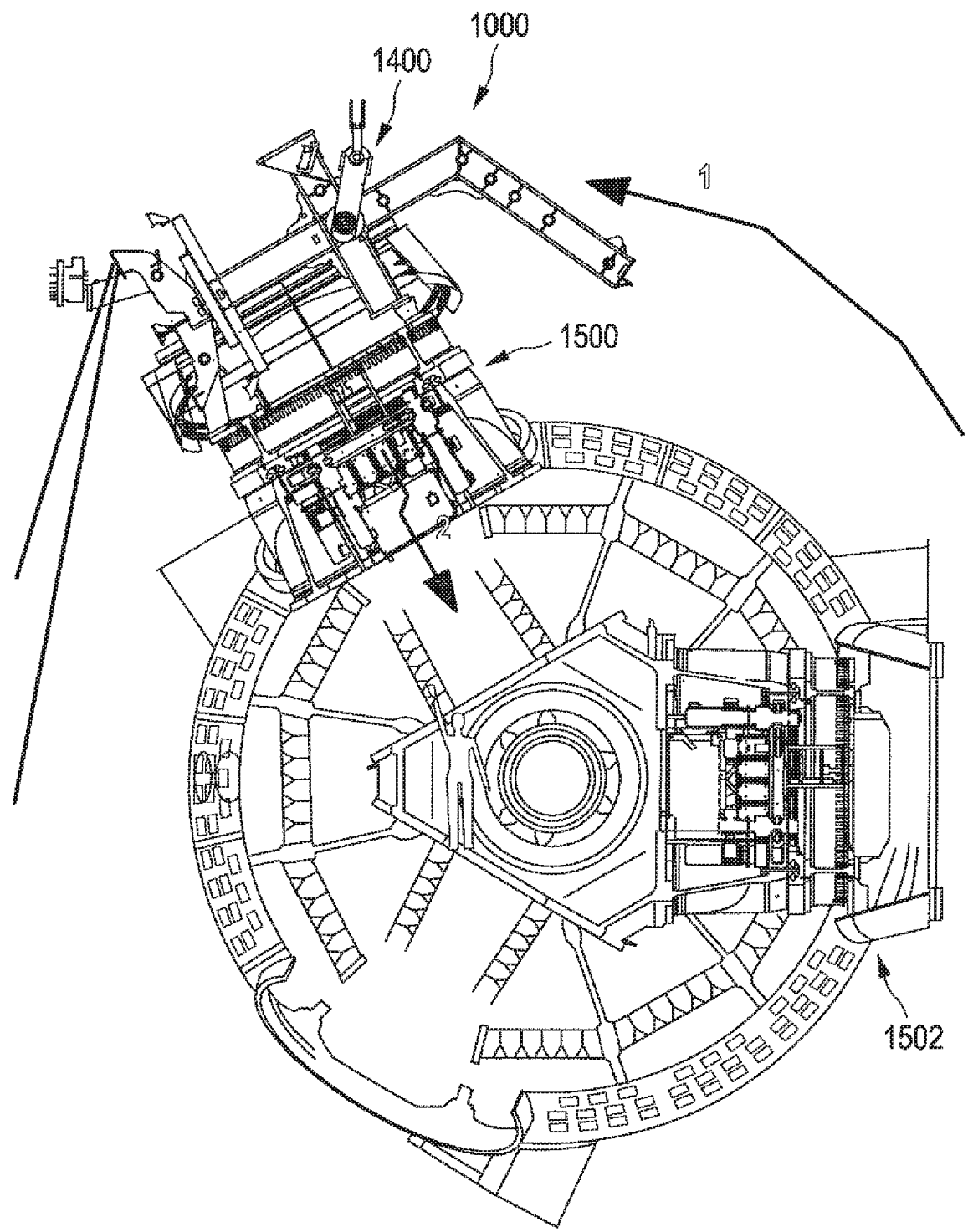
Figure 8O:
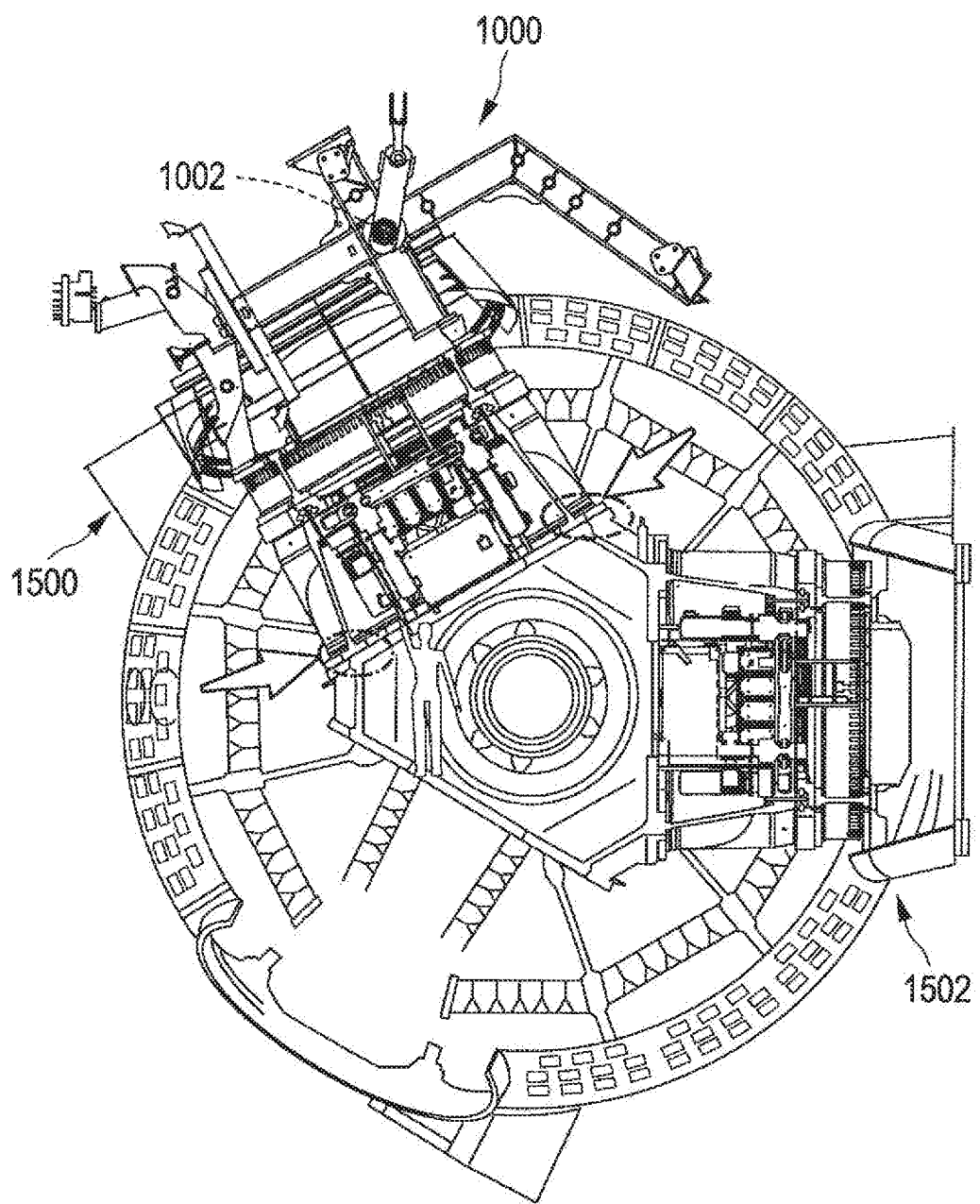
Figure 8P:
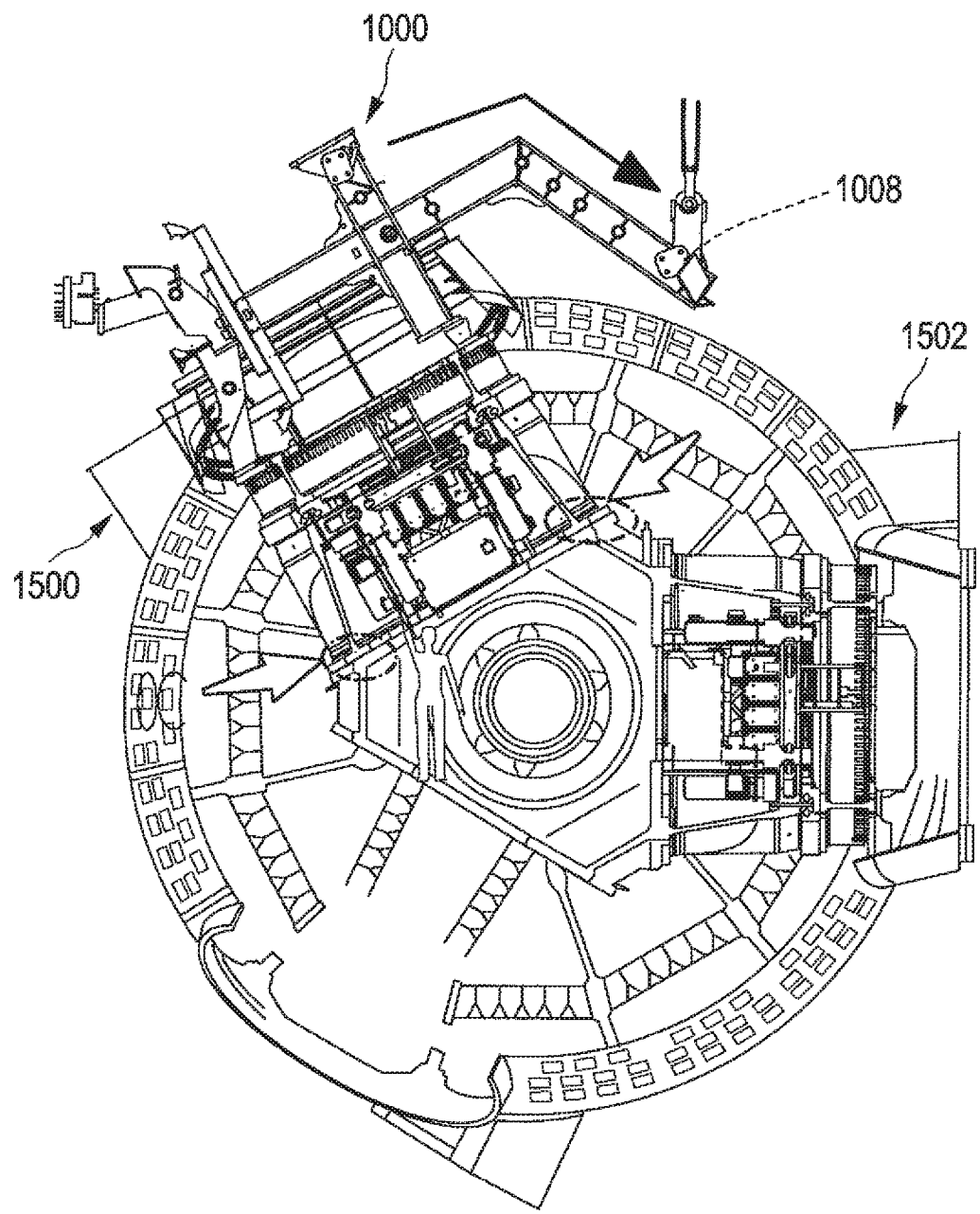
Figure 8Q:
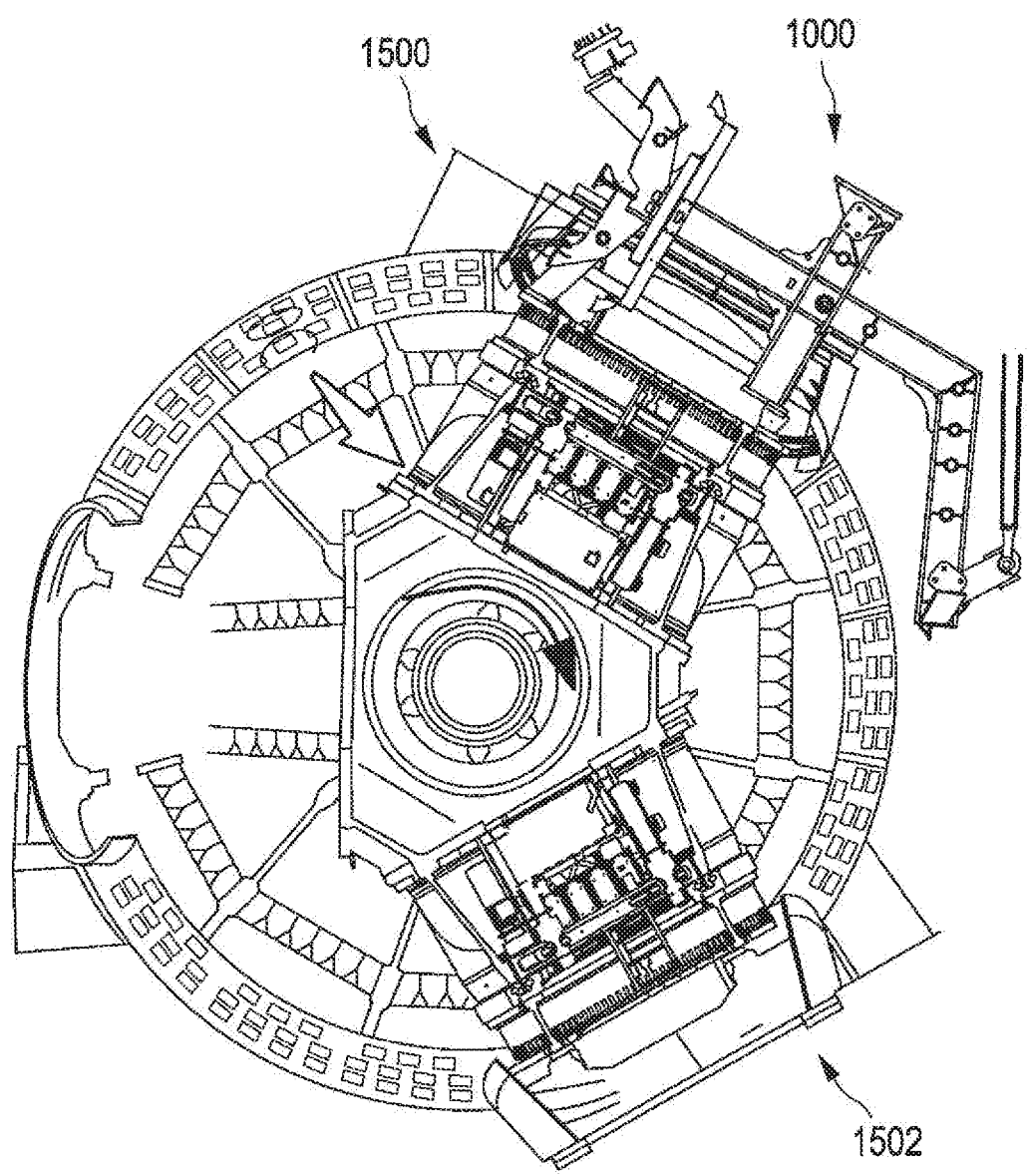
Figure 8R:
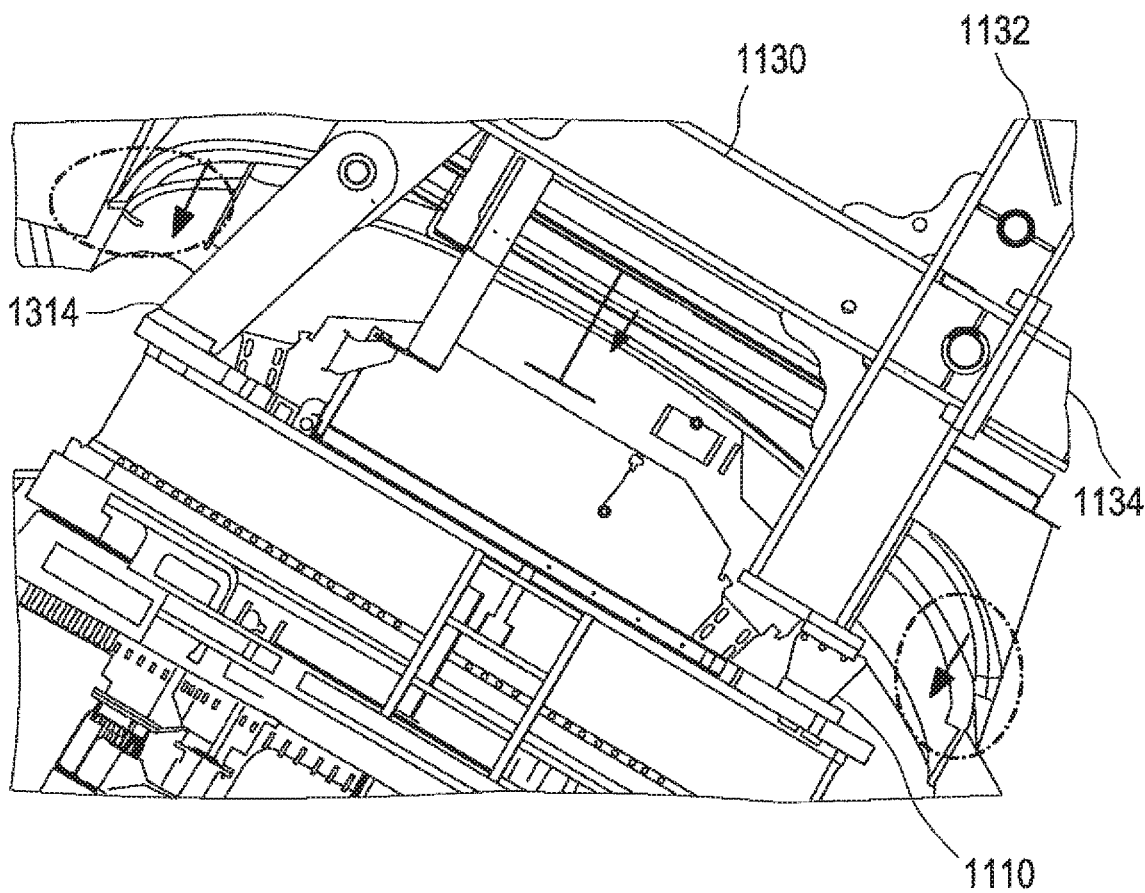
Figure 8S:
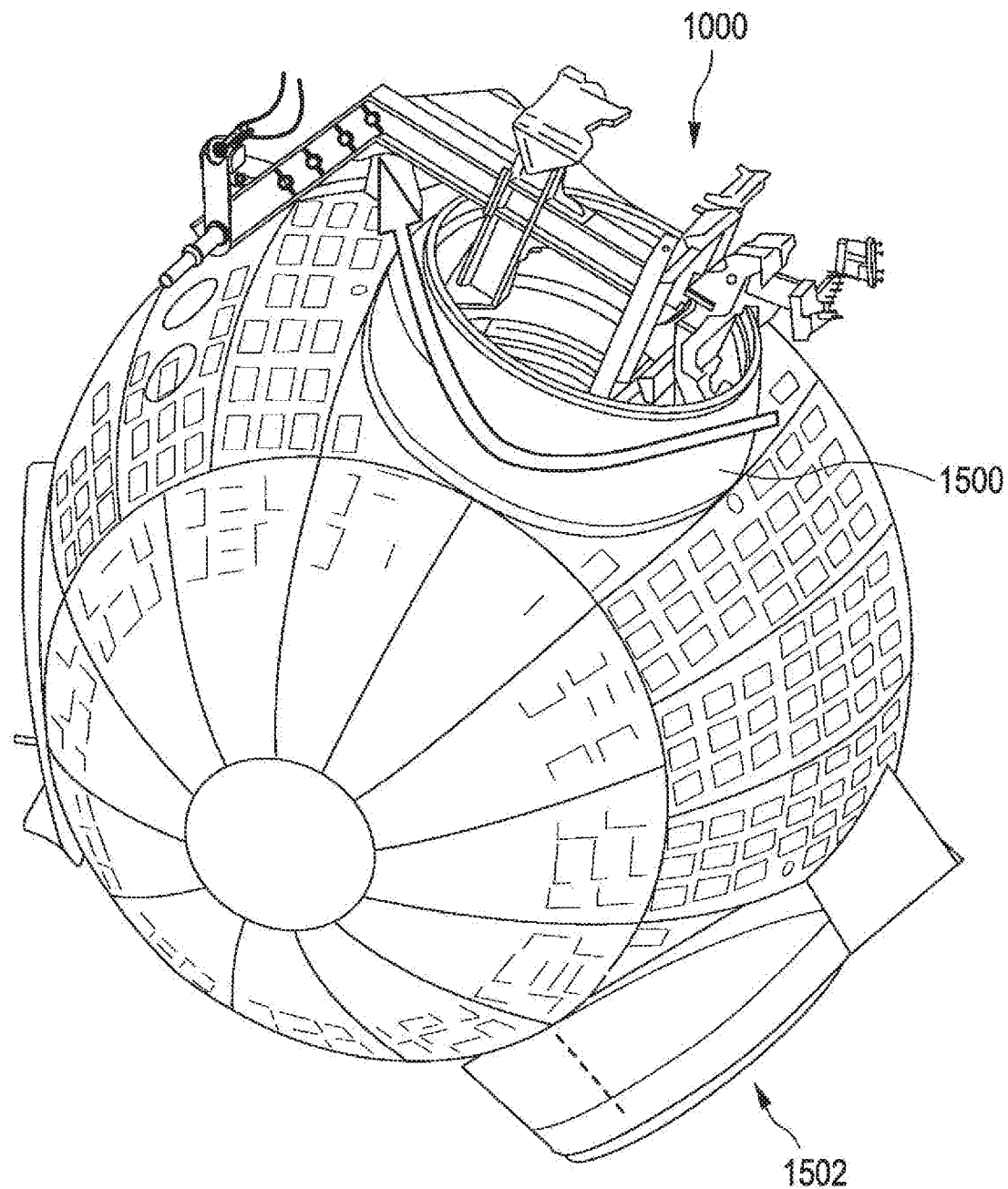
Figure 8T:
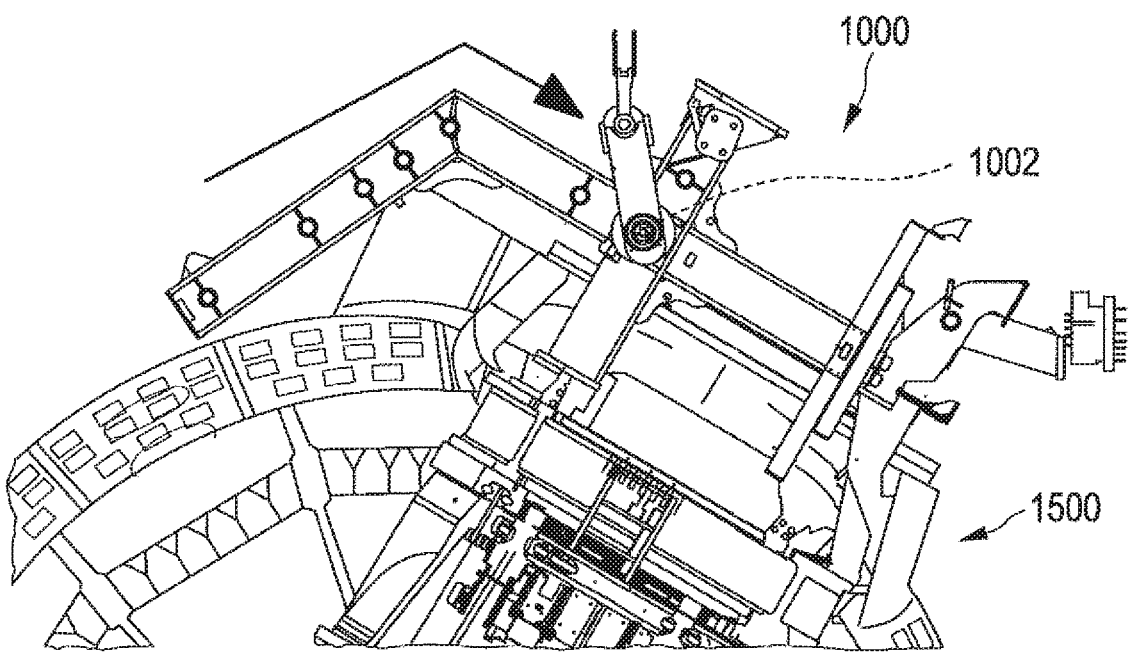
Figure 8U:
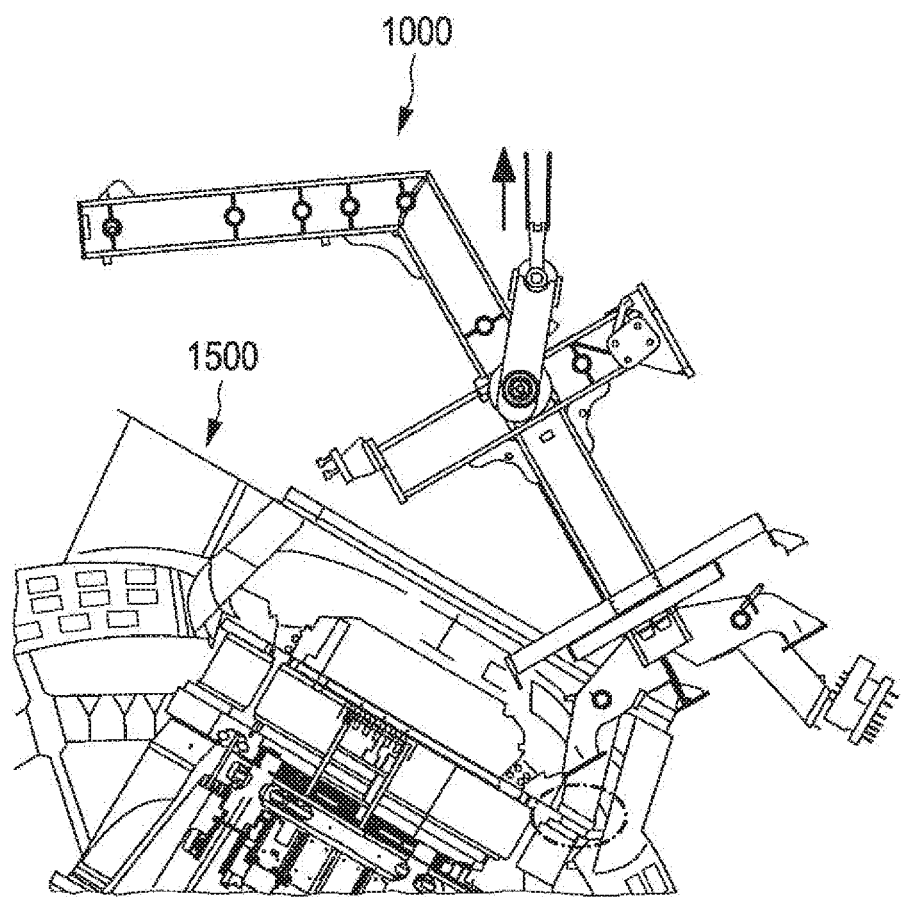

FIGS. 8a to 8u show schematic views during the assembly method according to the invention according to a first exemplary embodiment. The method is described using the example of the assembly of two blade connection units, to which the blade fold sleeves are already fastened. FIG. 8a shows a first step S1. As described above, the device 1000 is thus initially raised, so that the device 1000 stands securely on the bases 1310. The lower fastening plates 1314 of the fastening units 1110 and 1120 are folded down and bolted. Due to the raising of the device 1000, the carriage is still bolted and secured in position 4, thus in the locking bore 1004. The first blade connection unit having blade fold sleeve 1500 (hereinafter first component 1500) is located in a transport frame, which can be padded with excavator mats. Hanging for example on a crane, the device 1000 is moved towards the first component 1500 according to the arrow.

As shown in FIG. 8b, the first component 1500 is fastened to the device 1000. A plurality of screws is fastened to the upper fastening plate 1113 and the lower fastening plate 1314 of the fastening unit 1110 for this purpose. The first component 1500 can thereby substantially reach all the way to the first section 1100. In other words, the device is prepared and designed to accommodate components of a wind turbine of different size and shape. The carriage 1400 is displaced from the preceding position (position 4) to the position 8 (according to arrow 1) and is accordingly bolted and secured in the locking bore 1008 by means of the load pin 1422. The mentioned hydraulic cylinder or the pin retainer serves the purpose of securing. The device 1000 having the first component 1500 is to subsequently be lifted, so that, looking ahead, guide ropes can possibly be attached to the component 15000 and/or the device 1000. Prior to the lifting, screws, which secure the component 1500 in the transport frame, may need to also be loosened. When these preparatory steps have taken place, the device 1000 having the first component 1500 can be lifted according to arrow 2.

While the device 1000 having the component 1500 hangs in the air, the hub adapter unit of the blade connection unit can be rotated by 90° according to the arrow in FIG. 8c.

As already shown in FIG. 8d (arrow), the device 1000 having the first component 1500 is pivoted in the direction of a second component 1502. In the shown example, the second component 1502 is also a blade connection unit having a blade fold sleeve attached thereto. The second component 1502 as well as the first component 1500 is fastened to the upper fastening plate 1113 and the lower fastening plate 1314 of the second fastening unit 1120 by means of the device 1000.

FIG. 8e shows the device 1000 having the components 1500, 1502, which are fastened thereto, from the opposite side as could be seen in FIGS. 8a to 8d. To release the device 1000, a mat for the component 1500 is provided and placed underneath according to 1 in FIG. 8e. For the remainder of the process, it is necessary to displace the carriage 1400 into position 4 according to arrow 2 and to bolt and secure it in the locking bore 1004. According to 3, a round sling 1124 is fastened to the accommodation 1122 for a round sling, as it is shown in FIG. 8f. The round sling 1124 is thus guided through the accommodation 1122 behind the upper fastening plate 1113 of the fastening unit 1120 and is fastened thereto. The upper fastening plate 1113 of the fastening unit 1120 is attached to the accommodation 1122 for the round sling 1124 to some extent. In other words, the accommodation 1122 can be used optionally. If the accommodation 1122 is not needed for the method, the upper fastening plate 1113 can also be fastened directly to the arm 1112. For the process described by way of example, however, the accommodation 1122 is required in this case, as will be described below. After the round sling 1124 is attached, the device 1000 having the components 1500, 1502 can be lifted (arrow 4). The hub adapter unit of the blade connection unit 1502 can now also be rotated for example by 90° (arrow 5).

Prepared in this way, the device 1000 having the two components 1500, 1502 can be lifted to the designated height. As shown in FIG. 8g, the blade connection unit of the component 1502 is first guided towards a hub 112 of the turbine plant 100. The rotor 106 is thereby oriented in such a way that the component 1502 is assembled on the 3 o'clock position of the rotor 106. It is provided that the device 1000 or the component 1502, respectively, is guided slightly below an imaginary longitudinal rotor axis parallel in the direction of the opening of the hub 112 just in front of the hub flange, so that a contact with a possible blade expansion is avoided, as suggested in FIG. 8h with the border. It is shown in FIG. 8i, how a mechanic fastens the blade connection unit, which is still held by the lifting device, to a hub 112 of the wind turbine. The carriage 1400 is thereby bolted into the hole 1004.

In FIG. 8j, the carriage is displaced along the second section 1200, so that the carriage can be bolted in the hole 1008.

In FIG. 8k, the carriage 1400 is fastened in the hole 1008 and the lifting device can be released by 60°. The lifting device can in particular be pivoted downward with an adapter on the outside by 61°. This can in particular take place until the round slings 1124 are under tension.

In FIG. 8l, the lifting device is shown in a pivoted position, for example with α=61°. The round slings 1124 are under tension, so that no load is applied to the crane hook any longer. The carriage 1400 can be displaced, so that it can be bolted or fastened, respectively, in the hole 1002. The crane hook can subsequently be lifted slightly again, so that the round slings 1124 are no longer under tension.

In FIG. 8l, an optimal position of center of gravity of the lifting device with a first assembled component is shown.

FIG. 8m shows, how the device having the blade connection unit can be disassembled in the 9 o'clock position at an angle of 90°. The tension belt, which is fastened between the flange plate on the bottom and the base frame, slightly lifts the flange plate on the bottom. The two flange plates are rotated downward by approx. 180°. The two flange plates are located on the top and are fastened to the bottom of the flange plate by means of suitable lifting accessories on the lifting eyes.

FIG. 8n shows an assembly of the second blade connection unit in an 11 o'clock position. The lifting device 1000 having the blade connection unit 1500 is hereby held by means of a crane. For this purpose, in particular the lifting device is pivoted from the 3 o'clock position into an 11 o'clock position. The lifting device having the blade connection unit is threaded similarly as in the case of the 3 o'clock position and the blade connection unit is fastened to the hub of the wind turbine. The carriage 1400 is subsequently displaced along the second section again and is bolted in the hole 1008. The rotor hub is then rotated clockwise (FIG. 8q).

The carriage 1400 can be moved across the 12 o'clock dead center and can be bolted in the hole 1008.

The rotor hub is rotated clockwise, so that the second blade connection unit is rotated across the 12 o'clock dead center to a 9 o'clock assembly position. In FIG. 8r, a rotor blade fold sleeve can be assembled to 1 o'clock to be able to rotate the device via the blade flange bearing.

In FIG. 8s, the device is rotated to 1 o'clock across the spinner side by approx. 175°, so that the second section 1200 of the lifting device 1000 can be rotated upwards. The carriage 1400 can subsequently (FIG. 8t) be displaced again and can be bolted in the hole 1002. The lifting device 1000 can subsequently (FIG. 8u) be lifted and removed by a crane.

In the case of the method for assembling components of a wind turbine according to the second exemplary embodiment, the lifting device 1000 is set up on a flat ground and a first and second component of a wind turbine 1500, 1502 are fastened to the first and second fastening unit 1110, 1120. The carriage 1400 is bolted in the through hole 1004, so that the eye of the carriage is substantially located perpendicular to the first and second fastening unit. A first component 1500 of the wind turbine is fastened in or to a first rotor hub connection. The lifting device 1000 is lifted by means of a crane hook, so that one of the components 1500, 1502 can be fastened to a first rotor blade hub connection, which is in the 3 o'clock position (FIG. 8g). The lifting device 1000 can be guided slightly lower than the longitudinal blade axis, so that a blade fold sleeve does not optionally collide with a blade expansion (FIG. 8h). The component of the wind turbine is screwed to the first hub connection (FIG. 8i). The carriage 1400 is displaced and is fastened in the bore 1008 (FIG. 8j). The crane hook, which is fastened to an eye of the carriage 1400, then takes over the load of the lifting device 1000. The screws between the fastening unit and the component can be released subsequently (FIG. 8k). The carriage 1400 is displaced subsequently and is fastened in the bore 1004. The lifting device 1000 can then be pivoted downward by approximately 60° or 61°, until the round slings 1124 are tensioned and the crane hook no longer has any load (FIG. 8k, FIG. 8l). The lifting device 1000 can subsequently be lifted until the round slings 1124 are no longer under tension. The lifting device can be rotated from a 3 o'clock position into an 11 o'clock position by means of the rotor hub. A second component can be inserted into the opening, so that the component can then be fastened to the second rotor hub connection. The carriage 1400 can subsequently be displaced again and can be fastened in the bore 1008. The rotor locking can be unlocked and the rotor can be rotated, a crane hook can be released, until a free blade connection is reached in the 9 o'clock position (FIG. 8q).

Figure 9A:
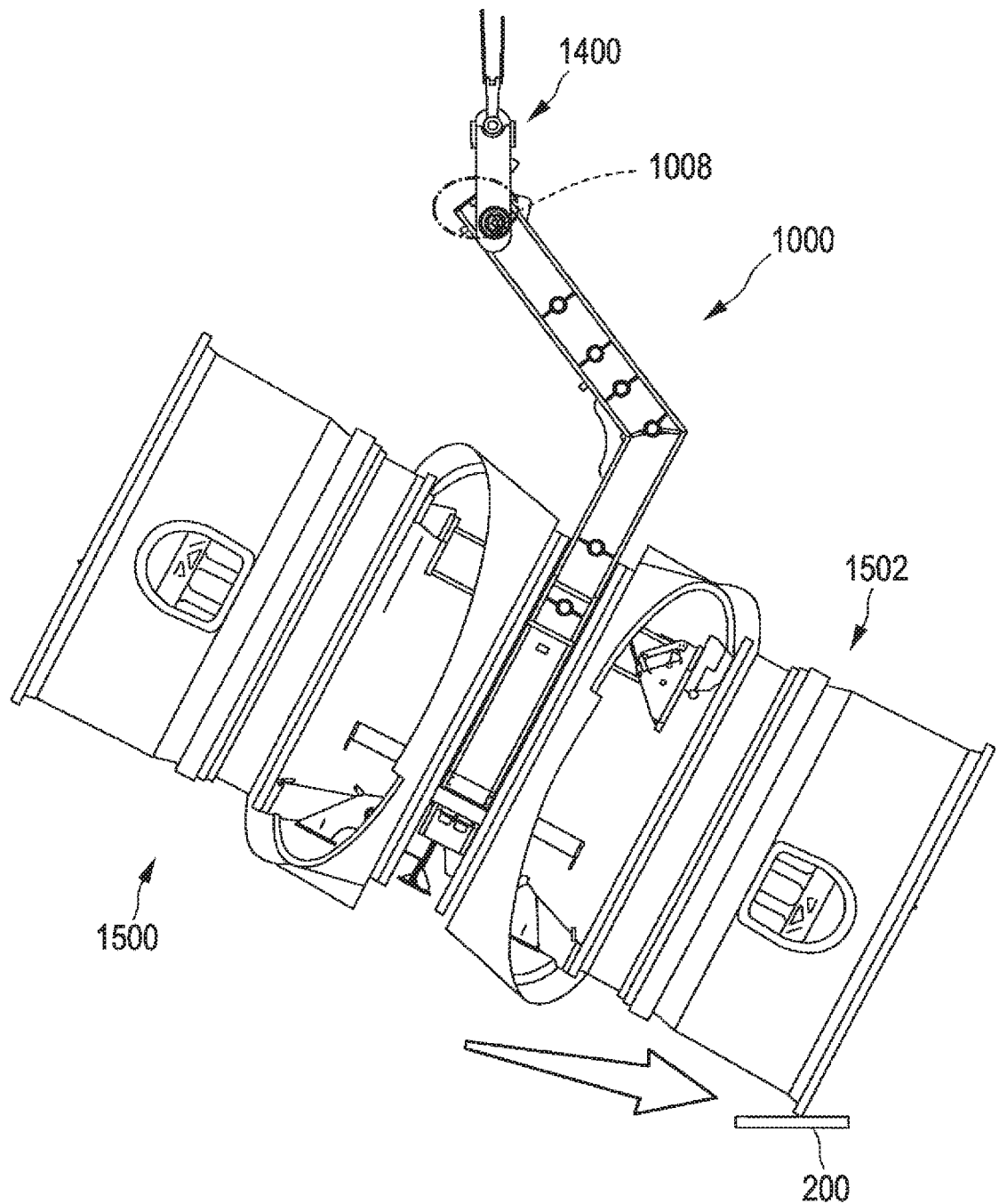
FIGS. 9a to 9c show different views in response to the assembly of components of a wind turbine according to a second exemplary embodiment.
Figure 9B:
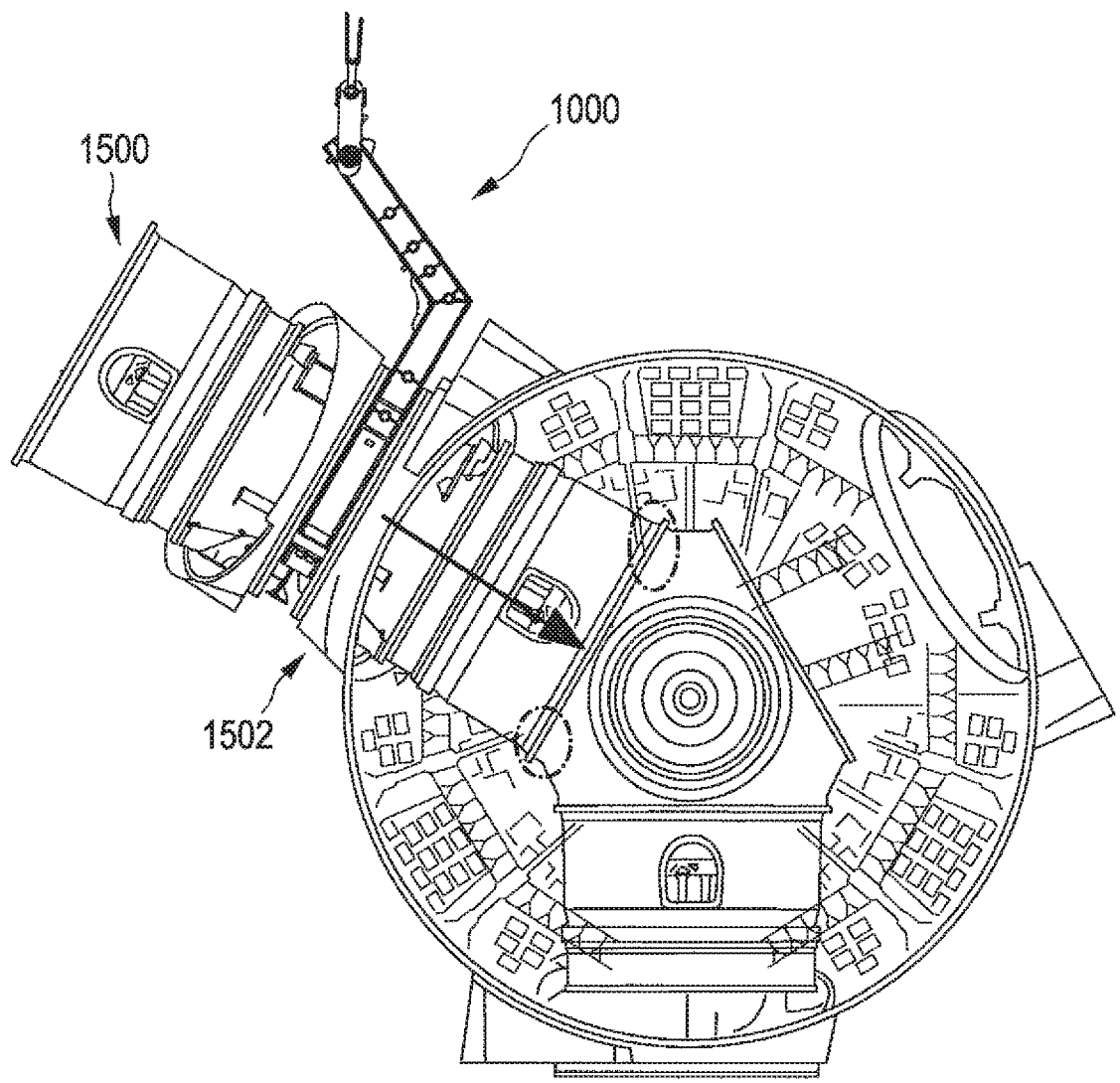
Figure 9C:
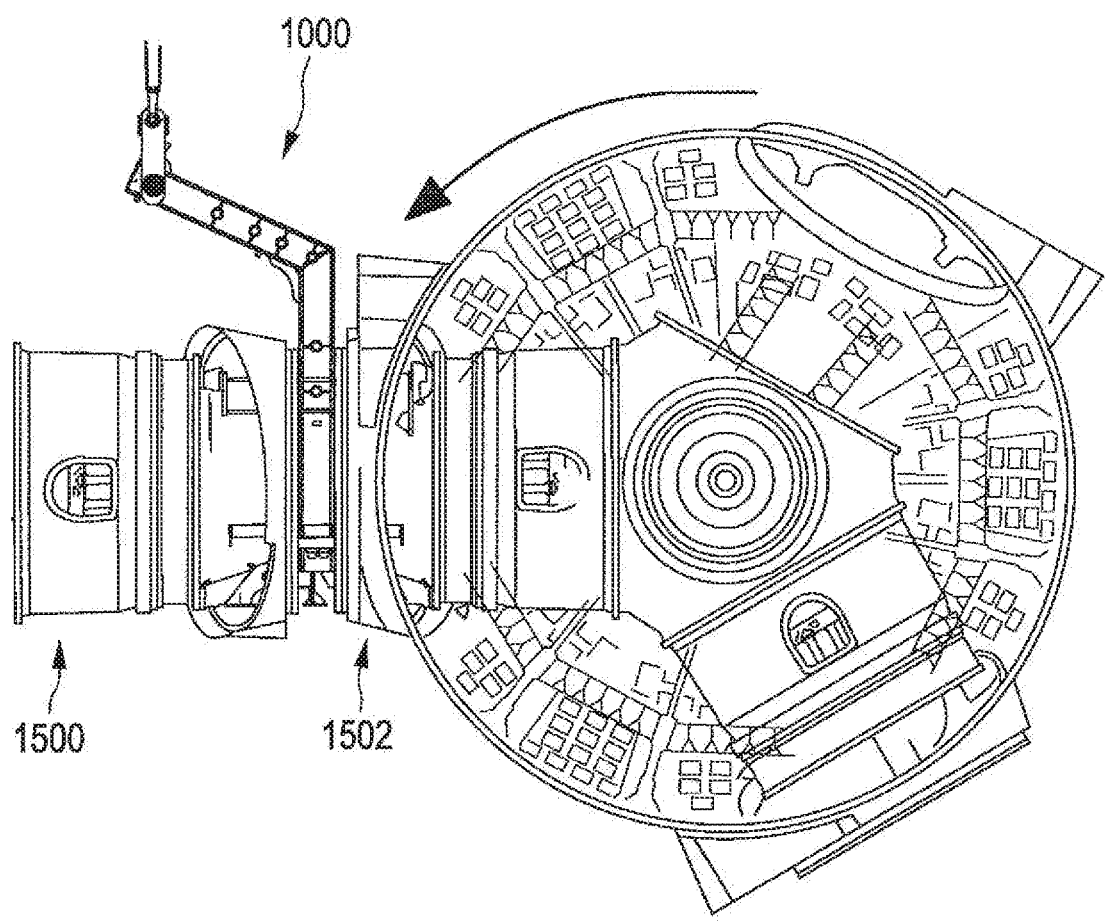

FIGS. 9a to 9c show different views in response to the assembly of components of a wind turbine according to a second exemplary embodiment. The lifting device 1000 according to the second exemplary embodiment can correspond to the lifting device according to the first exemplary embodiment (FIG. 2).

In FIG. 9*a*, the lifting device 1000 is shown having two blade connection units 1500, 1502. The carriage 1400 is bolted in the hole 1008 and the two blade connection units 1500, 1502 are provided so as to be angled by for example 30°. One of the blade connection units 1502 can thereby be positioned on a piece of wood 200. The lifting device 1000 having the two blade connection units can subsequently be lifted by means of a crane. According to the second exemplary embodiment, an assembly of the blade connection units takes place in a 2 o'clock position, an 11 o'clock position, and a 9 o'clock position.

As can be seen in FIG. 9*b*, one of the blade connection units 1502 is threaded into a rotor hub in the 11 o'clock position at 30°. This can take place, as described in the first exemplary embodiment in the 3 o'clock position. As can be seen in FIG. 9*c*, the rotor hub can subsequently be rotated counter-clockwise by 30°. The blade connection unit can then be assembled as described according to the first exemplary embodiment.

Figure 10:
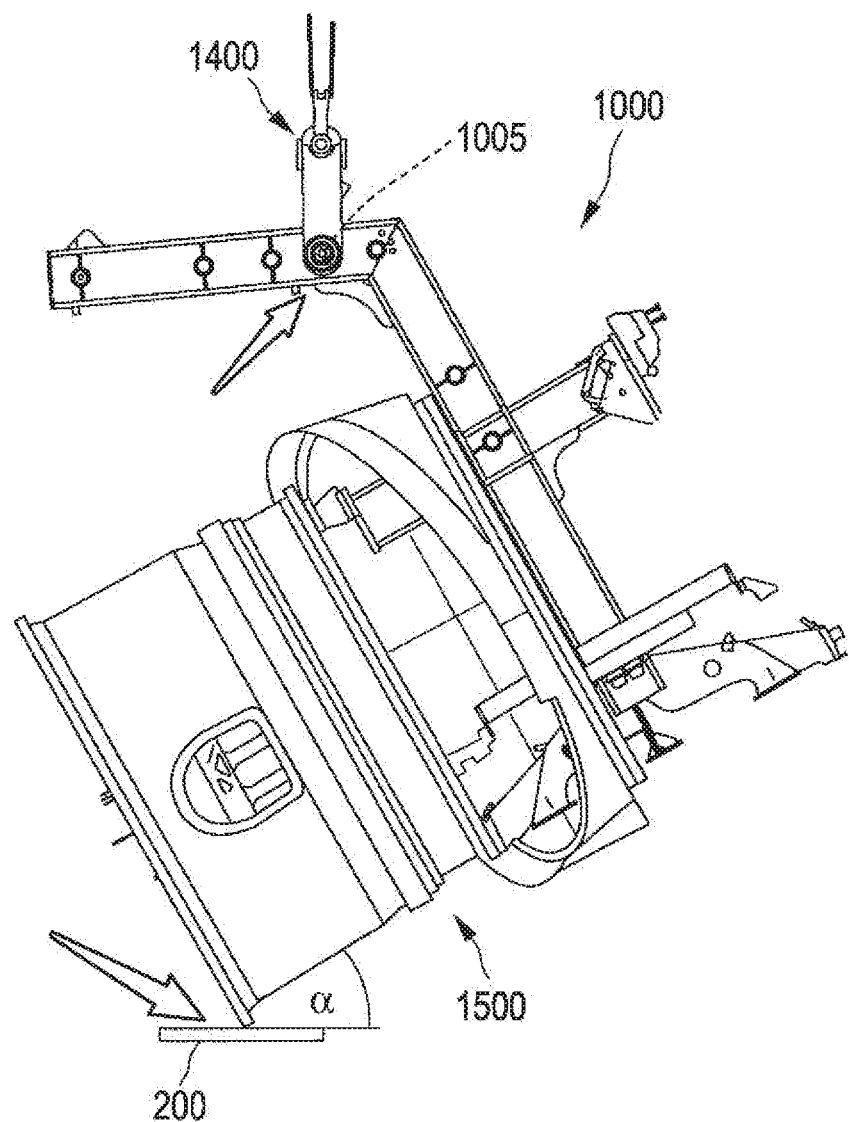
FIG. 10 shows a schematic illustration of a lifting device having an individual rotor blade connection unit according to a third exemplary embodiment, FIGS. 11a to 11g in each case show different views of the lifting device according to the invention in response to an assembly of components of a wind turbine according to a third exemplary embodiment.

FIG. 10 shows a schematic illustration of a lifting device having an individual rotor blade connection unit according to a third exemplary embodiment. The rotor blade connection unit 1500 can be placed on a piece of wood 200 and can be lifted at an angle α of for example 30° by means of the lifting device 1000. For this purpose, the carriage 1400 can for example be bolted in the hole 1005. According to the third exemplary embodiment, only an individual rotor blade connection unit is assembled. The lifting device 1000 having the individual blade connection unit 1500 can be lifted subsequently and can be assembled at a rotor hub, as already described above.

Figure 11A:
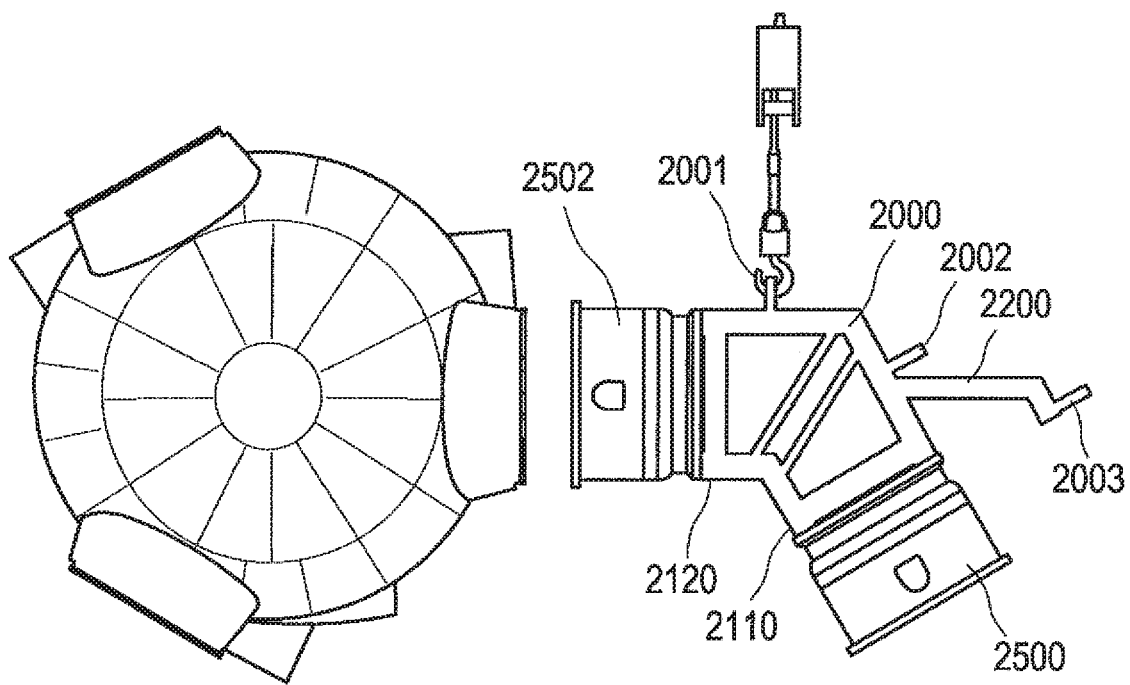
Figure 11B:
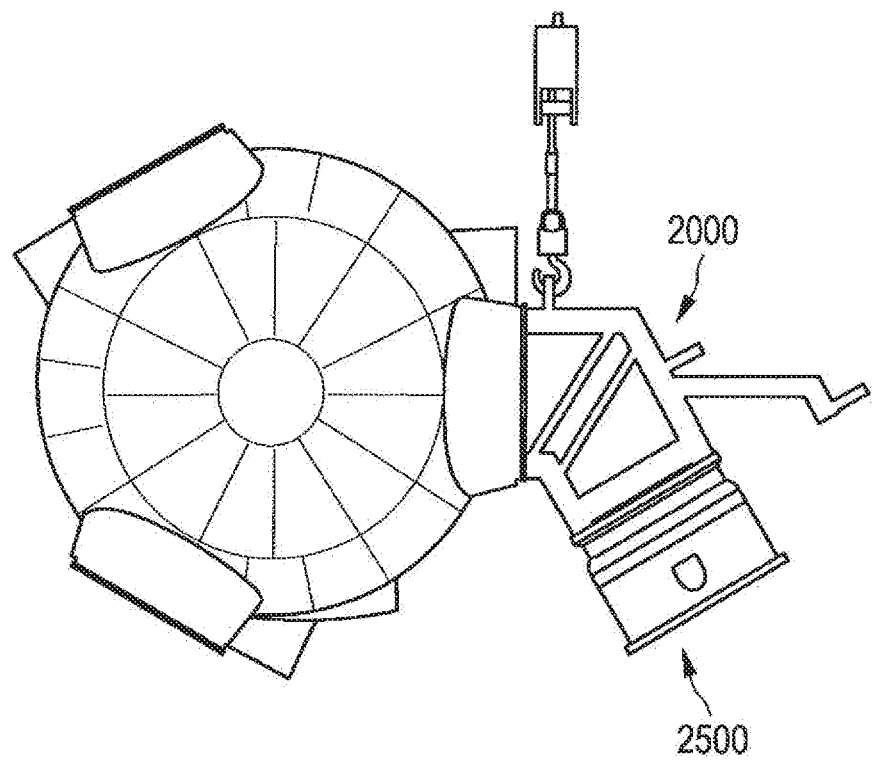
Figure 11C:
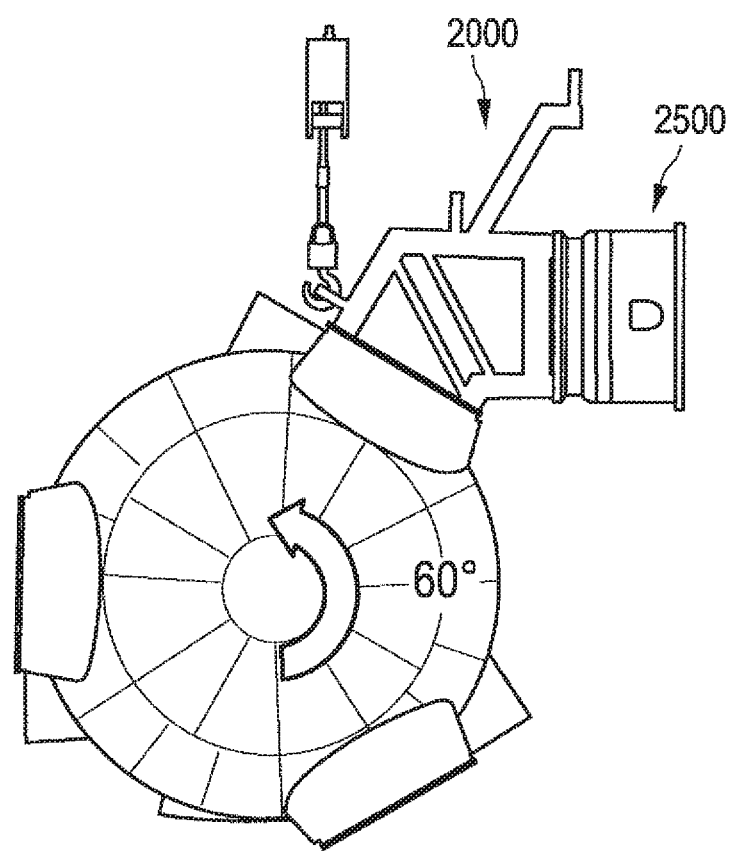
Figure 11D:
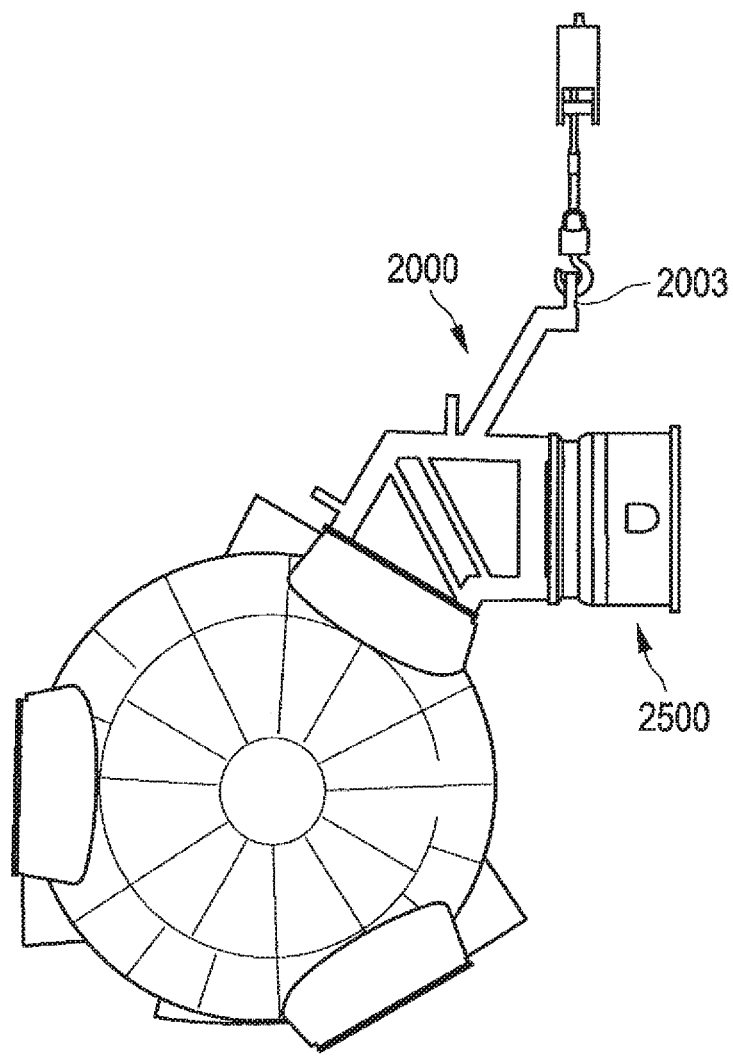
Figure 11E:
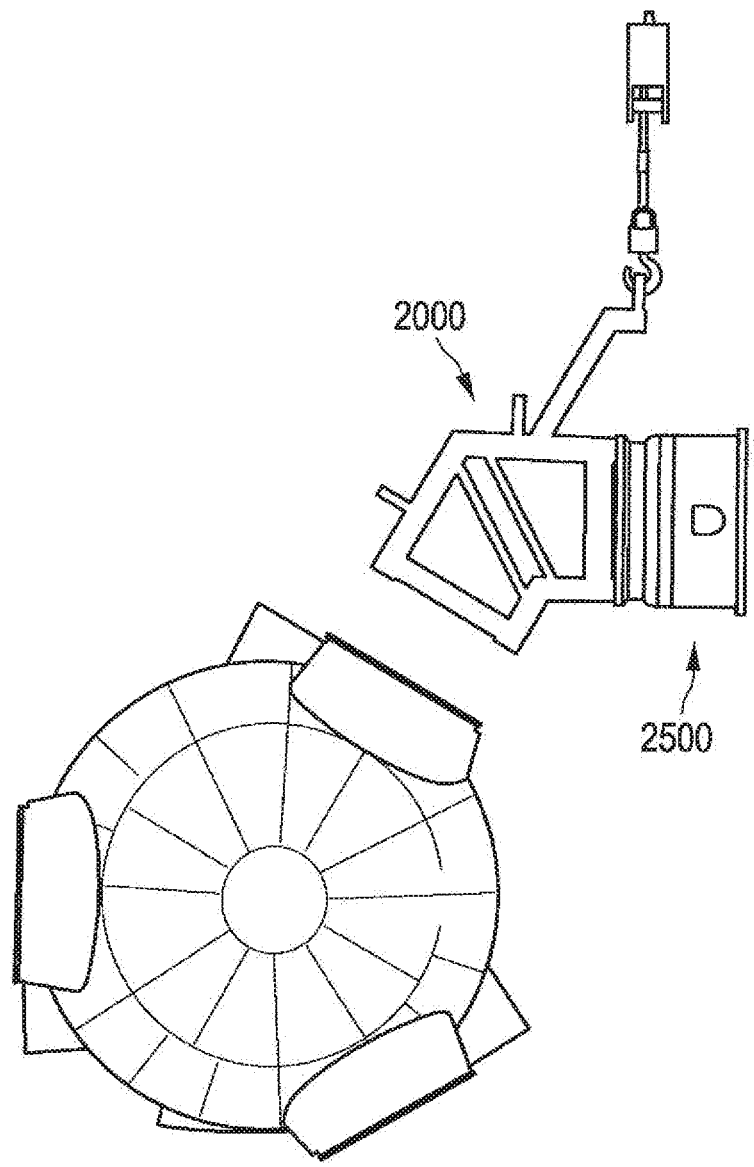
Figure 11F:
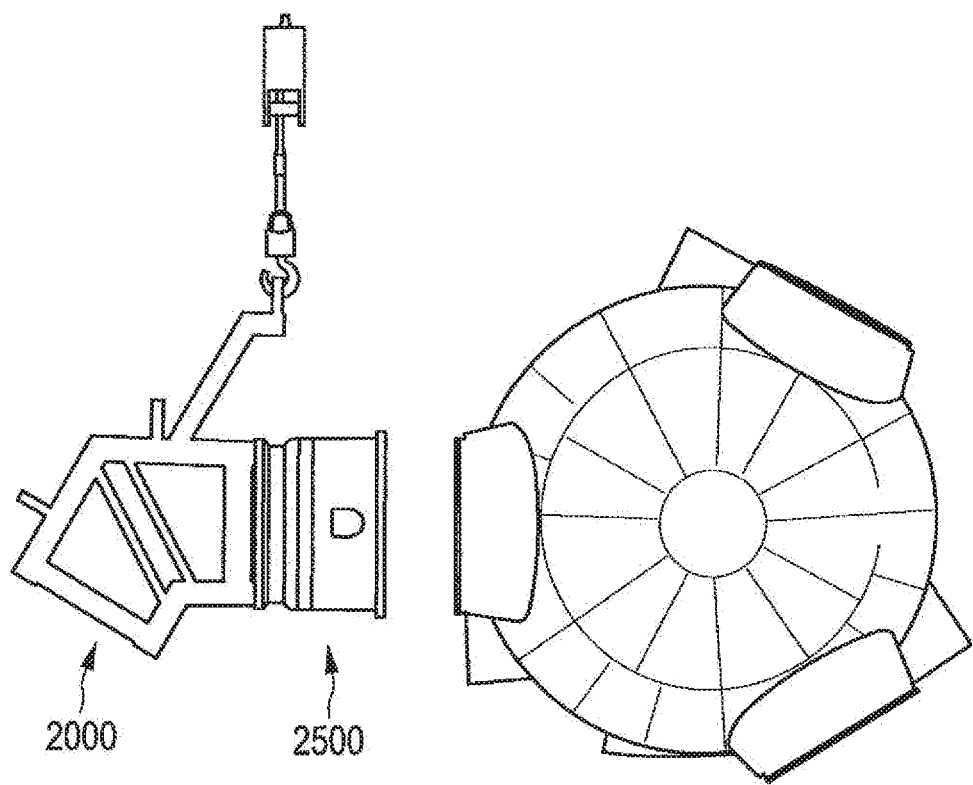
Figure 11G:
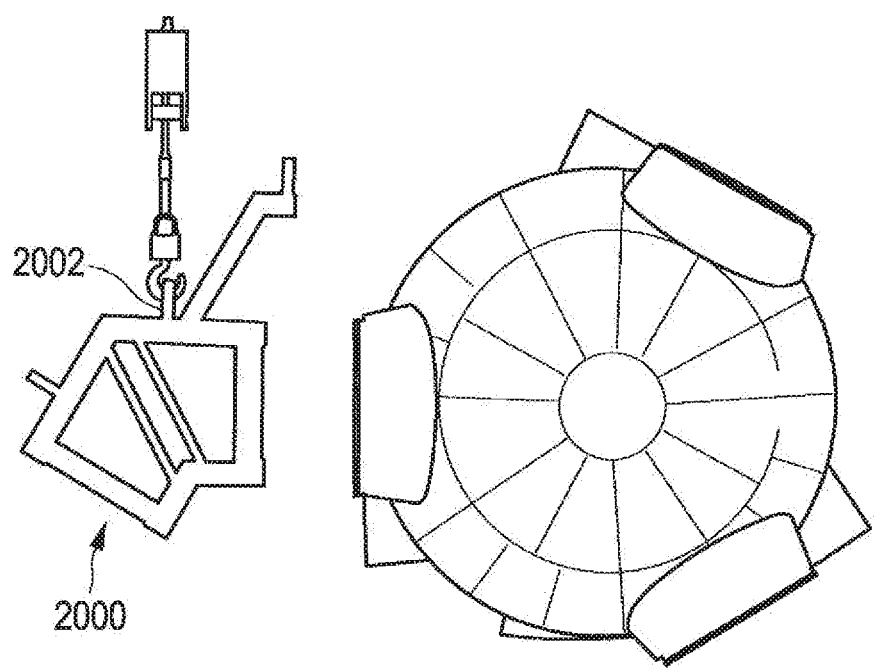

FIGS. 11*a* to 11*g* in each case show different views of the lifting device according to the invention in response to an assembly of components of a wind turbine according to a third exemplary embodiment. The lifting device 2000 according to the third exemplary embodiment has a first fastening unit 2110 and a second fastening unit 2120. The lifting device further has an arm 2200. The lifting device has three different hooks or eyes 2001-2003, which serve to accommodate a crane hook. The first and second fastening unit 2110, 2120 are arranged at an angle α relative to one another. This angle α can be for example 30°. For example, a first component 2500 of a wind turbine can be fastened to the first fastening unit 2110 and a second component 2502 of a wind turbine can be fastened to the second fastening unit 2120. As shown in FIG. 11*a*, a crane hook is hooked into a first hook 2100 in the vicinity of the second fastening unit 2120, and the lifting device 2000 having the two components of the wind turbine 2500, 2502 are lifted, while the rotor of the wind turbine is rotated into a 3 o'clock position, so that a component 2500 can be inserted. This is shown for example in FIG. 11*b*. As shown in FIG. 11*c*, the rotor can subsequently be rotated counter-clockwise by 60°, and the crane hook can be moved and can be fastened to the third hook 2300 (see FIG. 11*d*). The lifting device 2000, together with the component 2500, which can for example represent a blade connection unit, can be lifted subsequently. As shown in FIG. 11*f*, the lifting 2000 can subsequently be displaced to the other side of the rotor, wherein the blade connection unit 2500 is arranged in a 3 o'clock position, so that it can be inserted in and fastened to a rotor hub, which is in the 9 o'clock position. As shown in FIG. 11*g*, the lifting device can then be removed, whereby the crane hook can then be hooked into the second hook 2200.

Figure 12A:
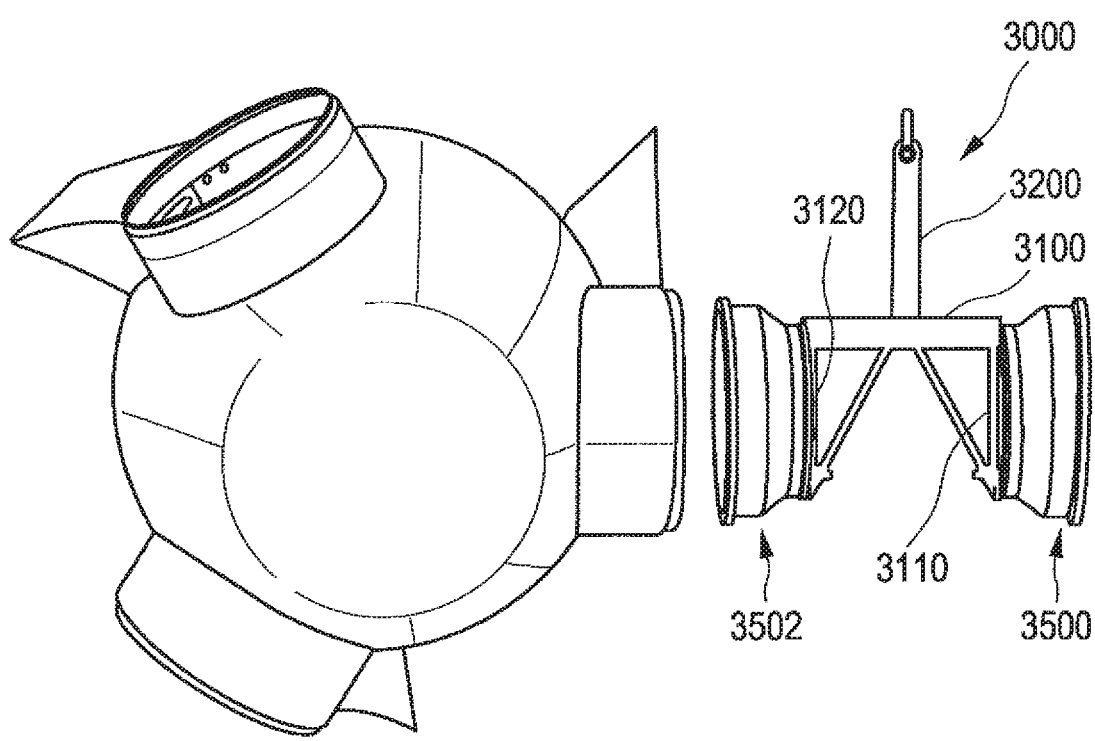
FIGS. 12a to 12f show different views of a lifting device for the assembly of components of a wind turbine according to a fourth exemplary embodiment.
Figure 12B:
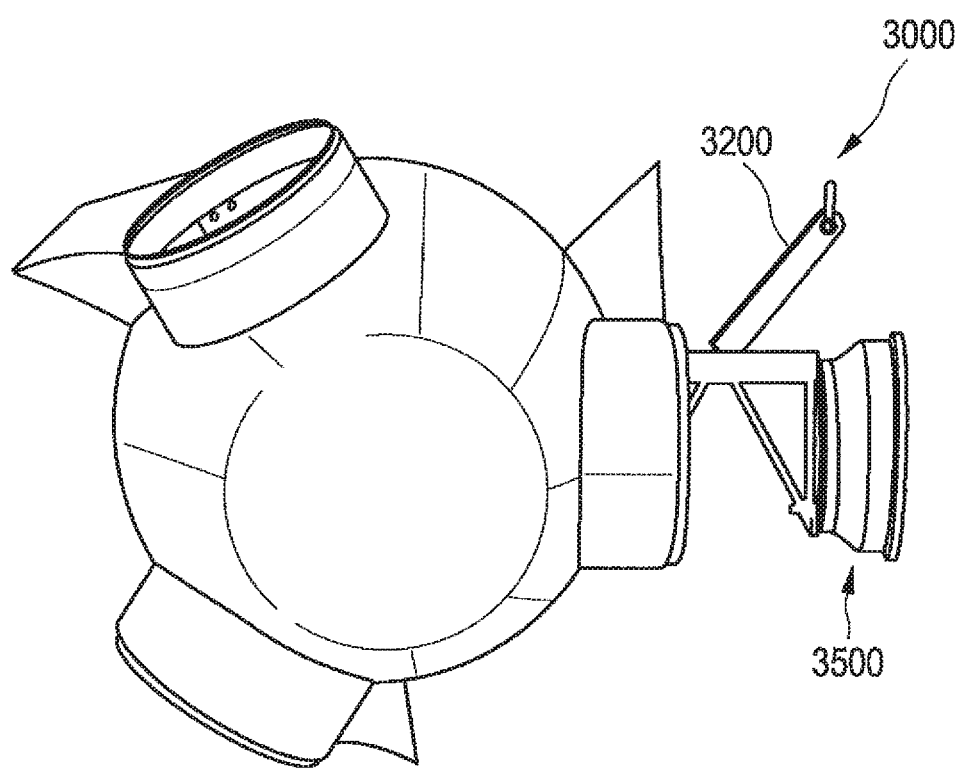
Figure 12C:
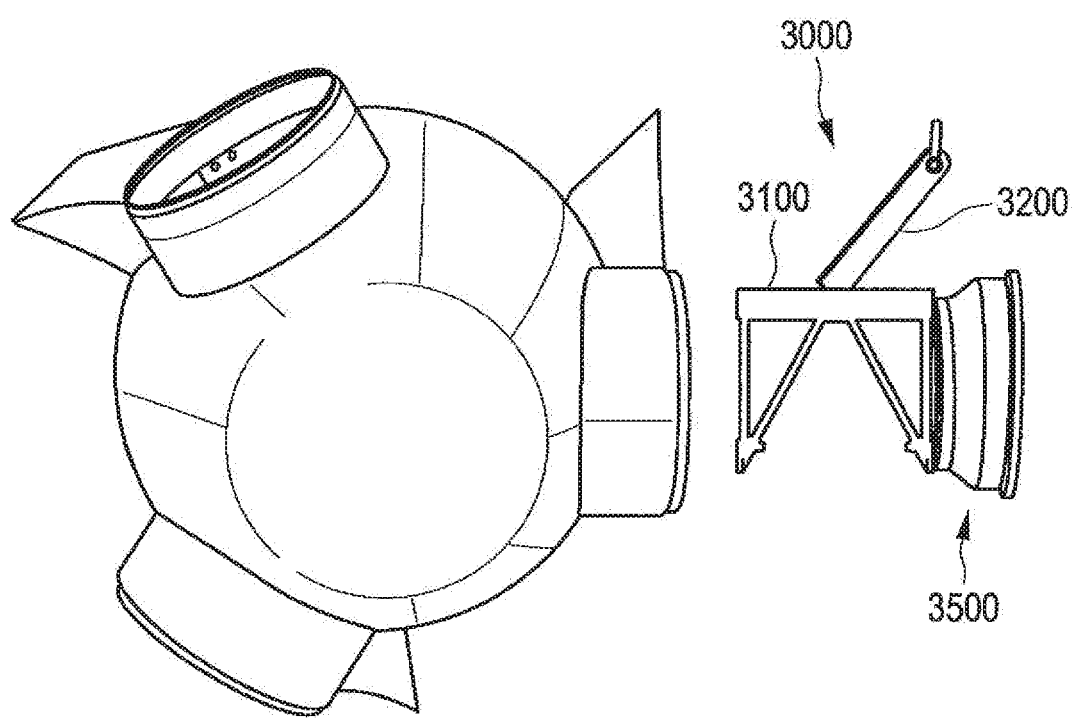
Figure 12D:
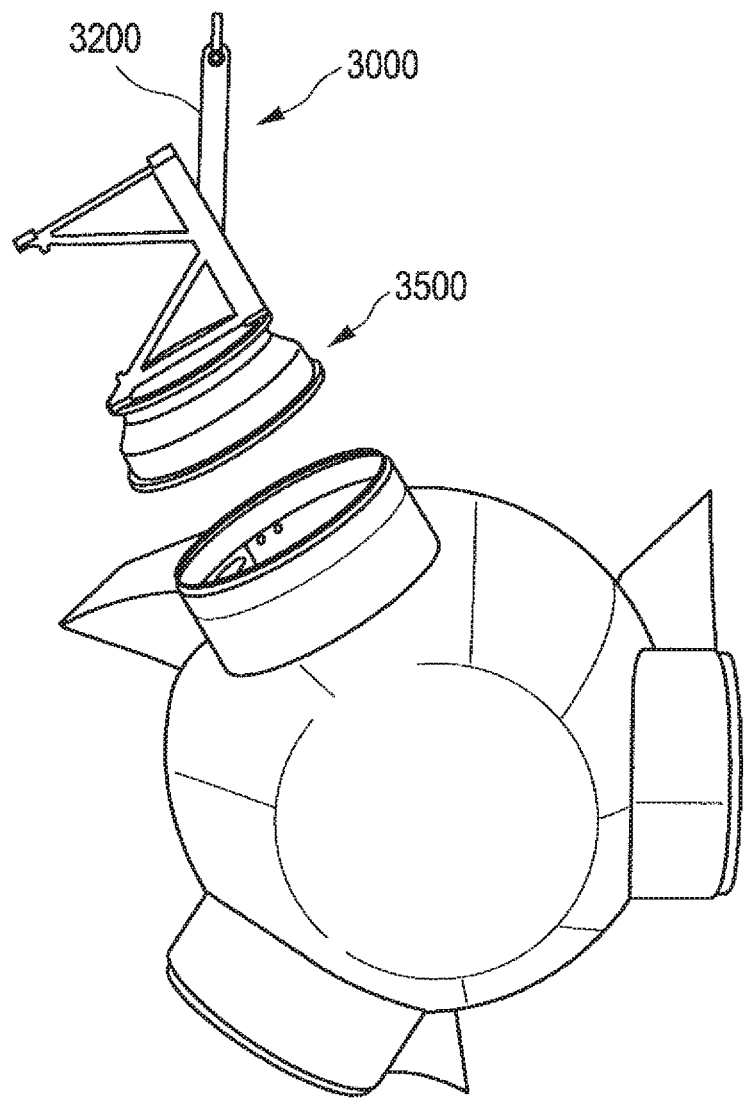
Figure 12E:
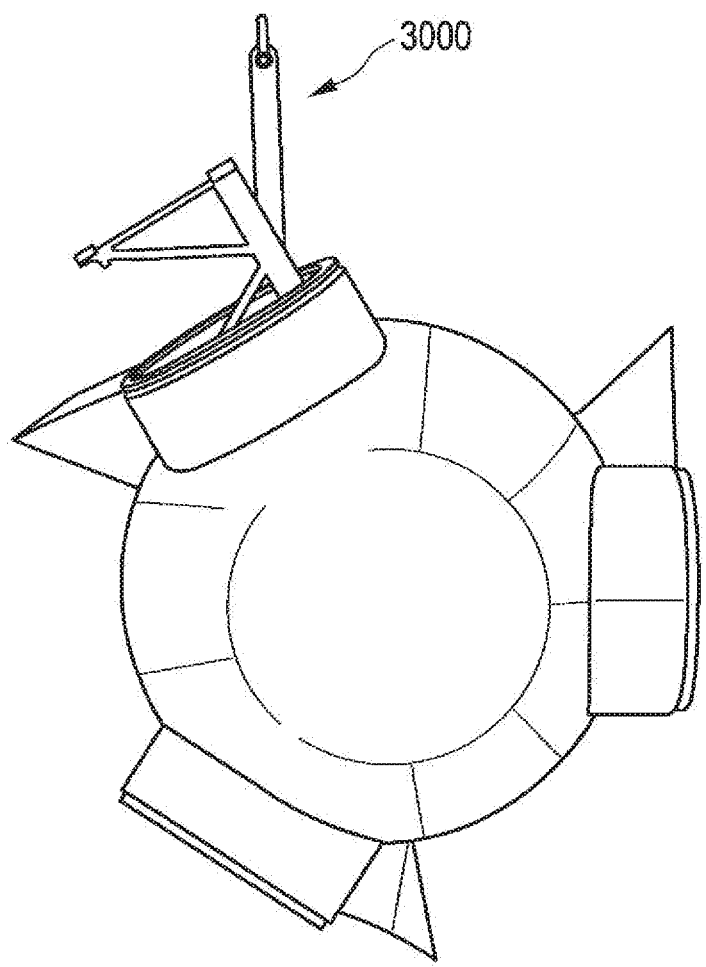
Figure 12F:
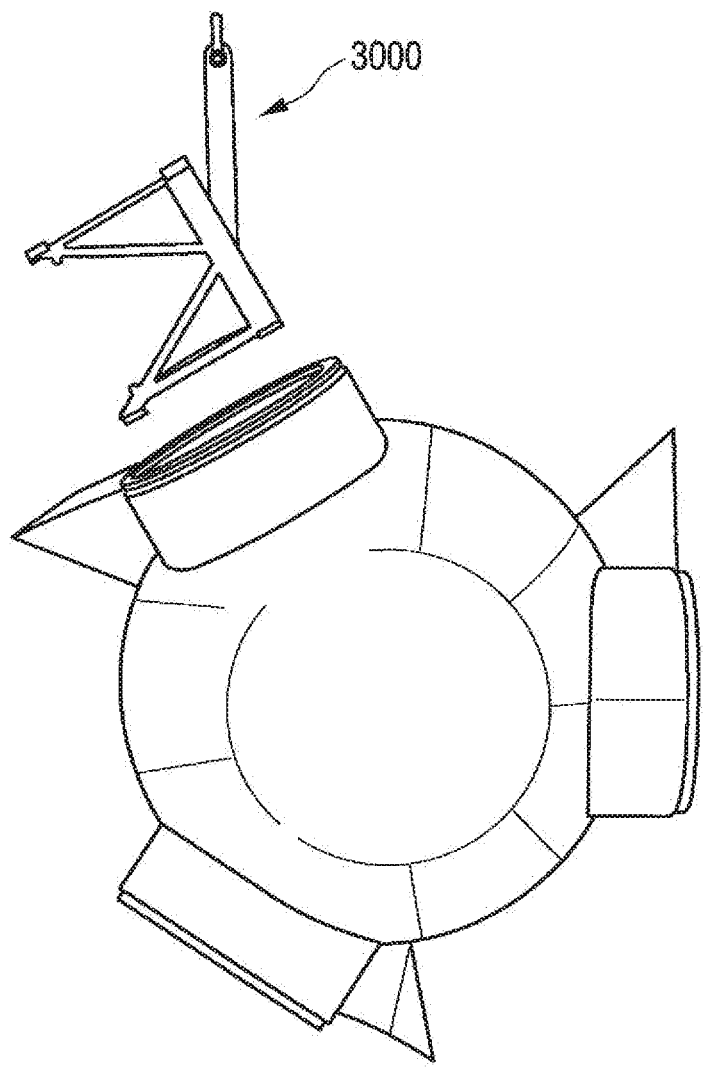

FIGS. 12*a* to 12*f* show different views of a lifting device for assembling components of a wind turbine according to a fourth exemplary embodiment. The lifting device 3000 has a first section 3100 having a first and second fastening unit 3110, 3120. The lifting device 3000 further has a second section 3200, which can be embodied as an arm and which can optionally be embodied so as to be pivotable with respect to the first section. The first and second fastening unit 3110, 3120 can for example be embodied substantially parallel to one another. A component of a wind turbine, such as, for example, a blade connection unit 3500, 3502, can be fastened to the first and second fastening unit 3110, 3120. The lifting device 3000 according to the fourth exemplary embodiment can be lifted, while a rotor blade connection of the rotor is in a 3 o'clock position (FIG. 12*a*). As can be seen in FIG. 12*b*, the component 3502, which is to be assembled, can then be inserted into the rotor blade connection and can be fastened to the rotor blade hub. The arm 3200 can subsequently be pivoted as in FIG. 12*b* and the lifting device 3000 can be released from the blade connection unit 3502 (FIG. 12*c*). The lifting unit 3000 can subsequently be lifted via the rotor and the blade connection unit 3500 can be inserted into a blade connection in the 11 o'clock position. For this purpose, the arm 3200 can be pivoted with respect to the first section 3100, so that component 3500 can be fastened (FIG. 12*e*). The component 3500 can subsequently be removed from the lifting device, and the lifting device can be released downward by means of the crane.

Figure 13A:
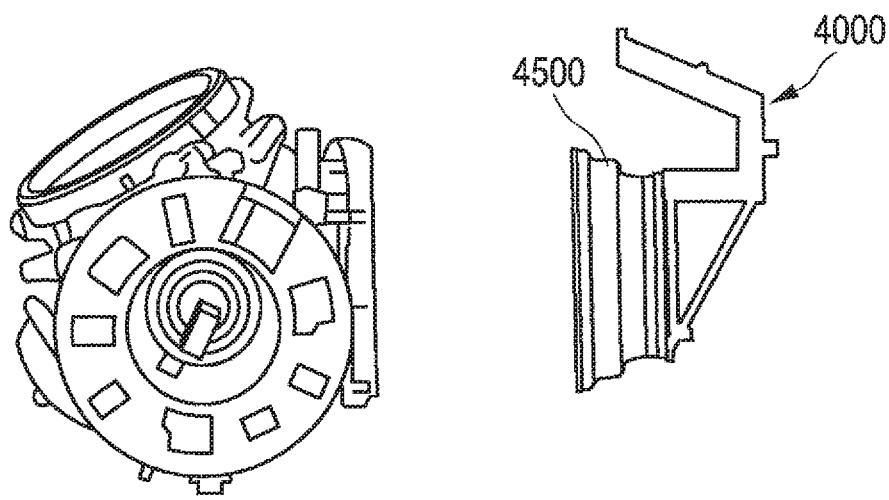
FIGS. 13a to 13f show different steps in response to the assembly of a component of a wind turbine according to a fifth exemplary embodiment.
Figure 13B:
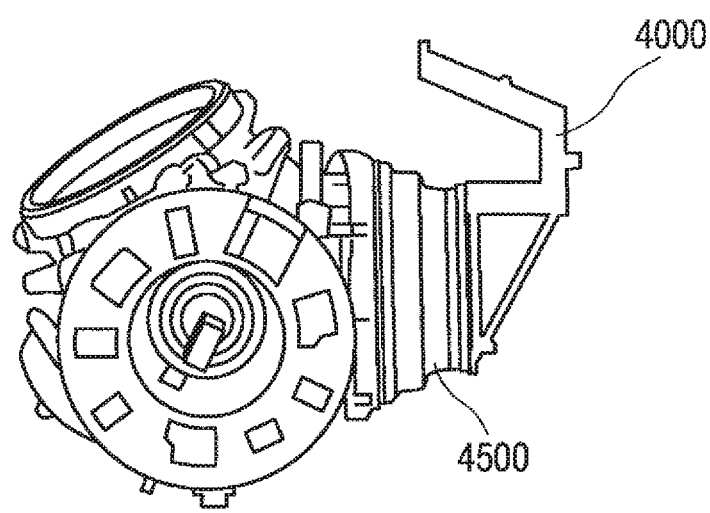
Figure 13C:
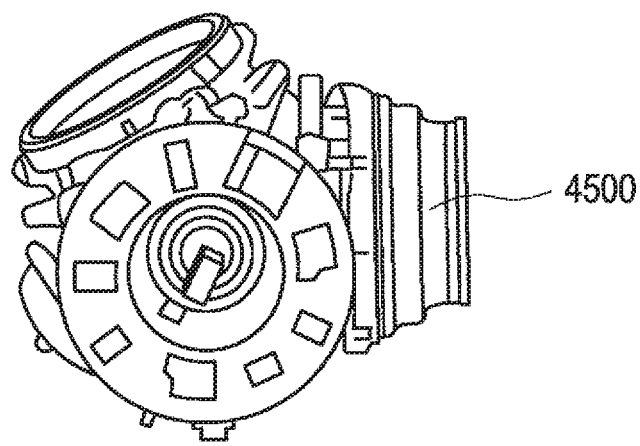
Figure 13D:
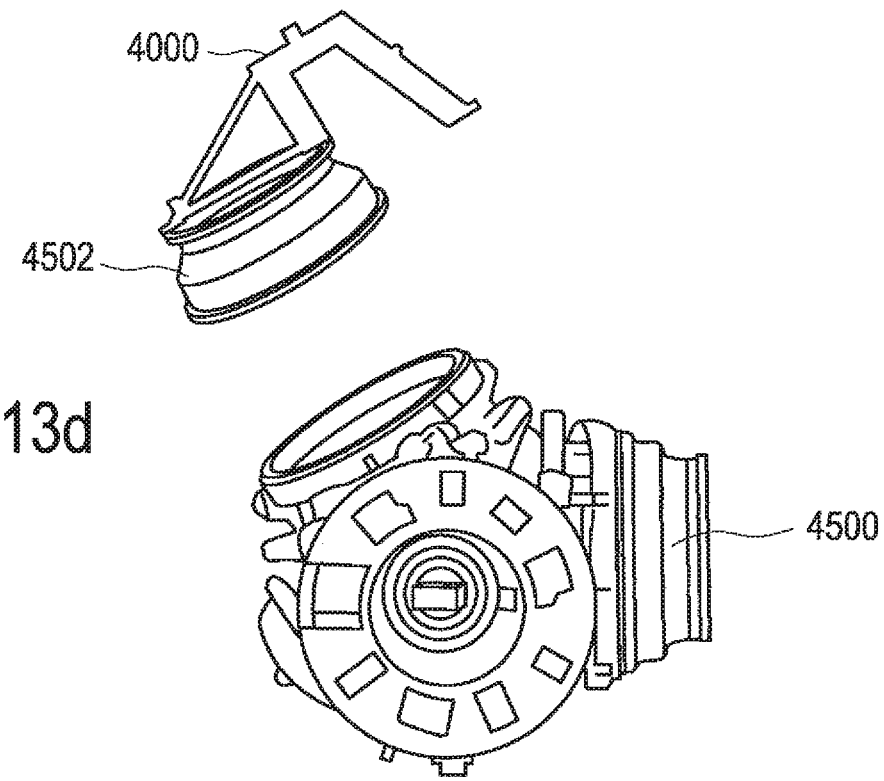
Figure 13E:
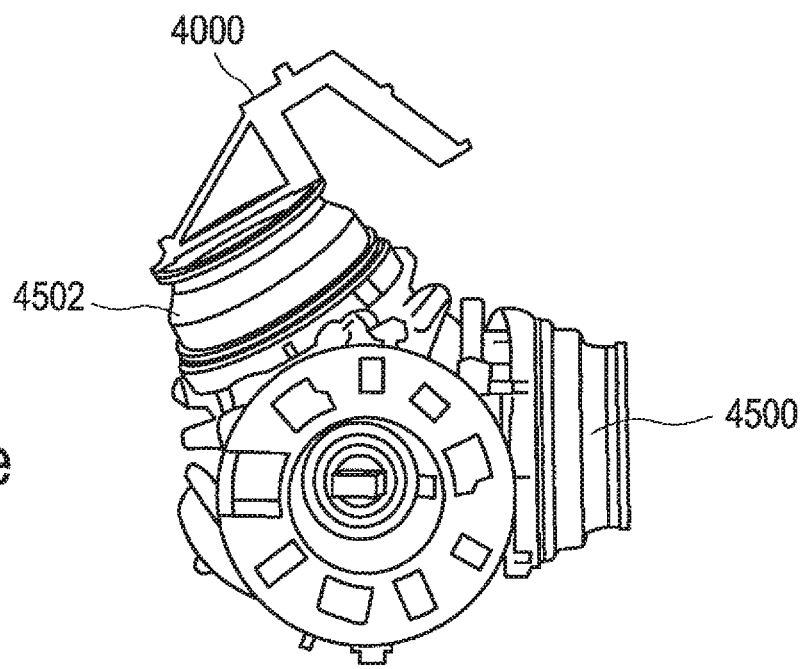
Figure 13F:
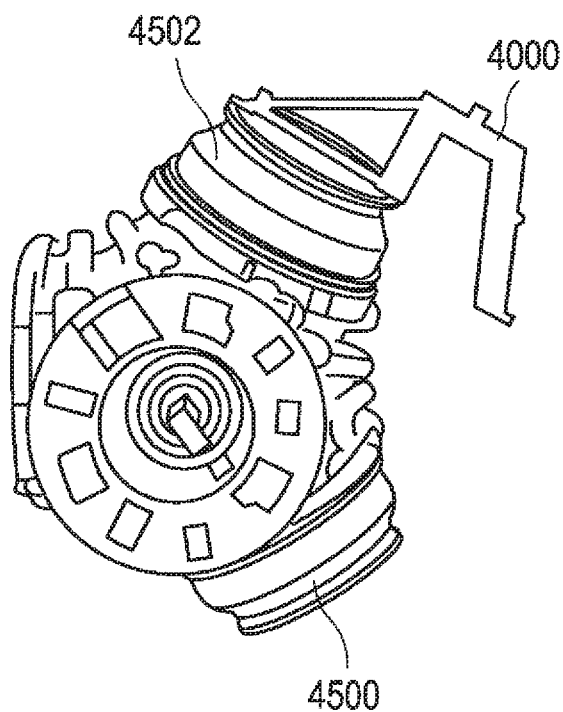

FIGS. 13*a* to 13*f* show different steps in response to the assembly of a component of a wind turbine according to a fifth exemplary embodiment. According to the fifth exemplary embodiment, a lifting device 4000 is provided, which only has a first fastening unit as well as an arm. A plurality of stop points for a crane can be provided on the arm. As shown in FIG. 13*a*, the rotor hub is rotated in such a way that a hub connection is in the 3 o'clock position. The component 4500, which is connected to the fastening unit of the lifting device 4000, is guided towards and fastened to the rotor hub. The lifting device 4000 is subsequently removed (FIG. 13*c*) and a second component 4502 is fastened to the lifting device. The lifting device 4000 is then lifted and the second component 4502 is fastened to a rotor blade connection in the 11 o'clock position (see FIGS. 13*d*, 13*e*). The rotor is subsequently rotated clockwise, until a rotor blade hub connection is in the 9 o'clock position. A further assembly of a component can take place subsequently.

The lifting device serves in particular for lifting one to two identical components in different angular positions. Such components can represent blade connection units, blade fold sleeves, blade adapters, blade adapters including blade flange bearing or the like.

The lifting device according to an aspect of the present invention has a base frame, an I-beam, a carriage, a flange plate on the top of the I-beam side, a flange plate on the top, a flange plate on the bottom, a landing, a round sling accommodation and a base of the I-beam.

A plurality of parts, preferably two parts can be lifted simultaneously with a single crane path by means of the lifting device as well as the method according for assembling components of a wind turbine. This is an advantage with regard to the number of the crane paths and the crane time and leads to a more efficient setup of the wind turbine. It should in particular be observed hereby that, starting at a wind speed of between 9 and 10 m/s, it is no longer possible to pull up components by means of a crane. A shortening of the crane times or a reduction of the crane path, respectively, is thus advantageous.

The invention claimed is:

1. A lifting device for lifting components of a wind turbine, the lifting device comprising:
    first and second fastening units, each including first and second sets of plates and fasteners configured to fasten the first and second fastening units to a component of the wind turbine;
    a first arm having a plurality of bores, wherein the plurality of bores are provided along the first arm at different angles relative to the first and second fastening units; and
    second and third arms, wherein the first sets of plates of the first and second fastening units are coupled at ends of the second and third arms, respectively; and
    a bottom unit, the second sets of plates of the first and second fastening units being pivotably coupled to the bottom unit and configured to move between an operating position and a transport position,
    wherein the first and second sets of plates of the first and second fastening units are arranged parallel to one another.

2. The lifting device according to claim 1, wherein the first arm is at least partially or in sections arranged at an angle relative to the first and second fastening units.

3. The lifting device according to claim 1, further comprising:
    a carriage configured to be secured in one of the plurality of bores,
    wherein the carriage has a tab or eye for accommodating a crane hook.

4. The lifting device according to claim 1, wherein the first arm has a first straight section and a second angled section.

5. A method for assembling components of a wind turbine using a lifting device having first and second fastening units, a carriage, and a first arm having a plurality of bores, wherein the plurality of bores are provided along the first arm at different angles relative to the first and second fastening units, wherein the carriage is configured to be secured in one of the plurality of bores, the method comprising:
    using plates and fasteners of the first and second fastening units, fastening at least first and second components of the wind turbine to the first and second fastening units, respectively, of the lifting device;
    locking the carriage in a first bore of the plurality of bores so that a crane hook that is fastened to the carriage is oriented perpendicular to the first and second fastening units;
    fastening the first component of the wind turbine to a first rotor hub connection in a 3 o'clock position;
    releasing the first component of the wind turbine from the first fastening unit;
    displacing the carriage and locking the carriage in a second bore of the plurality of bores, the second bore being located between the first and second fastening units;
    pivoting the lifting device about an angle;
    lifting, rotating, and displacing the lifting device so that the second component of the wind turbine is in a position so that the second component can be fastened to a second rotor hub connection;
    fastening the second component of the wind turbine to the second rotor hub connection, while the second component is still fastened to the second fastening unit of the lifting device; and
    releasing the second component of the wind turbine from the second fastening unit.

6. A method for assembling components of a wind turbine to the wind turbine by a lifting device having first and second fastening units, a carriage, and a first arm having a plurality of bores, wherein the first and second fastening units each include a plate and fasteners, wherein the plurality of bores are provided along the first arm at different angles relative to the first and second fastening units, the method comprising:
    fastening first and second components of the wind turbine to the first and second fastening units of the lifting device;
    locking the carriage in a first bore of the plurality of bores so that a crane hook that is fastened to the carriage is oriented at an angle of 30° relative to the first and second fastening units;
    lifting the lifting device;
    fastening the first component of the wind turbine to a first rotor hub connection that is in the 11 o'clock position;
    displacing the first rotor hub so that the lifting device is in the 9 o'clock position;
    releasing the first or second components of the wind turbine from the first or second fastening units;
    displacing the carriage and locking the carriage in a second bore of the plurality of bores, the second bore being located between the first and second fastening units; and
    pivoting the lifting device about an angle.

* * * * *